United States Patent
Cséfalvay

(10) Patent No.: US 10,249,026 B2
(45) Date of Patent: Apr. 2, 2019

(54) DENOISING FILTER

(71) Applicant: Imagination Technologies Limited, Kings Langley (GB)

(72) Inventor: Szabolcs Cséfalvay, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 192 days.

(21) Appl. No.: 15/223,642

(22) Filed: Jul. 29, 2016

(65) Prior Publication Data
US 2017/0032500 A1  Feb. 2, 2017

(30) Foreign Application Priority Data

Jul. 31, 2015 (GB) .................................. 1513591.6

(51) Int. Cl.
G06T 5/00 (2006.01)
G06T 5/20 (2006.01)
G06T 15/06 (2011.01)

(52) U.S. Cl.
CPC ............ G06T 5/002 (2013.01); G06T 5/20 (2013.01); G06T 15/06 (2013.01)

(58) Field of Classification Search
CPC ........... G06T 5/002; G06T 5/20; G06T 15/06
See application file for complete search history.

(56) References Cited

U.S. PATENT DOCUMENTS 5,296,937 A * 3/1994 Nakatani ................ H03H 17/04
348/E5.078
5,581,667 A * 12/1996 Bloomberg ............ G06K 15/02
358/1.9

(Continued)

FOREIGN PATENT DOCUMENTS

EP      1394742 A1    3/2004
EP    1 814 078 A1    8/2007

(Continued)

OTHER PUBLICATIONS

Gunturk et al. "High-Resolution Image Reconstruction from Multiple Differently Exposed Images" IEEE Signal Processing Letters, vol. 13, No. 4, Apr. 2006—pp. 197-200.*

(Continued)

*Primary Examiner* — Mia M Thomas
(74) *Attorney, Agent, or Firm* — Vorys, Sater, Seymour and Pease LLP; Vincent M DeLuca

(57) ABSTRACT

A pixel filter receives a sequence of pixels, each pixel having an associated pixel value. A first recursive filter operation is performed in a first direction through the sequence of pixels to form a first filtered pixel value for each pixel, and a second recursive filter operation is performed in a second direction through the sequence of pixels to form a second filtered pixel value for each pixel. The first and second filtered pixel values for a given pixel are determined in dependence on the pixel value at that pixel and the filtered pixel value preceding that pixel in their respective direction of operation, the filtered pixel value of the preceding pixel being scaled by a measure of similarity between data associated with that pixel and its preceding pixel. For each pixel of the sequence, the first and second filtered pixel values are combined to generate a filter output for the pixel.

20 Claims, 8 Drawing Sheets

(56) References Cited

U.S. PATENT DOCUMENTS

| | | | |
|---|---|---|---|
| 6,555,804 B1* | 4/2003 | Blasing | B60S 1/0822 |
| | | | 250/208.1 |
| 6,675,387 B1* | 1/2004 | Boucher | H04N 19/503 |
| | | | 370/487 |
| 6,728,416 B1* | 4/2004 | Gallagher | G06T 5/004 |
| | | | 382/173 |
| 8,823,810 B2* | 9/2014 | Mistretta | G06T 5/50 |
| | | | 348/158 |
| 8,989,516 B2* | 3/2015 | Albu | G06T 3/4053 |
| | | | 382/167 |
| 9,509,905 B2* | 11/2016 | Gordon | H04N 5/2354 |
| 2006/0187308 A1* | 8/2006 | Lim | G06T 5/50 |
| | | | 348/208.4 |
| 2007/0103570 A1 | 5/2007 | Inada et al. | |
| 2008/0085061 A1* | 4/2008 | Arici | G06T 5/20 |
| | | | 382/268 |
| 2010/0067816 A1* | 3/2010 | Blackham | G09G 3/3611 |
| | | | 382/255 |
| 2011/0102638 A1* | 5/2011 | Susanu | G06T 5/009 |
| | | | 348/239 |
| 2015/0117793 A1 | 4/2015 | Deng et al. | |
| 2016/0292837 A1* | 10/2016 | Lakemond | G06T 5/002 |
| 2017/0084007 A1* | 3/2017 | Rakhshanfar | H04N 5/21 |
| 2017/0353729 A1* | 12/2017 | Liaghati | H04N 19/159 |

FOREIGN PATENT DOCUMENTS

| | | |
|---|---|---|
| WO | 95/17792 A2 | 6/1995 |
| WO | 2013/044907 A1 | 4/2013 |

OTHER PUBLICATIONS

Veach et al; "Optimally Combining Sampling Techniques for Monte Carlo Rendering"; Siggraph 95 Conference Proceedings; Computer Science Department Stanford University; Sep. 15, 1995; pp. 419-428.

Delbracio et al; "Accelerating Monte Carlo Renderers by Ray Histogram Fusion"; Image Processing on Line; vol. 5; Mar. 11, 2015; pp. 55-72.

* cited by examiner

DENOISING FILTER

BACKGROUND OF THE INVENTION

This invention relates to a filter and method for filtering pixels of a frame in a graphical processing system, and in particular for filtering pixels in a frame rendered by path or ray tracing.

Several techniques are available for rendering three-dimensional (3D) scenes for display on a computer system. These include scanline rendering into two dimensions of a scene described in the computer system in three dimensions, path tracing and ray tracing. Path tracing forms an image by determining the net colour arriving at each pixel of a frame defined at a particular viewpoint in a 3D scene. The net colour is calculated by integrating over the contributions from all of the light rays received at the pixel, including light rays which have been reflected (potentially multiple times) by surfaces in the scene. By defining physically accurate models of the surfaces and light sources in the scene, including the reflection characteristics of the surfaces, very realistic images can be rendered. Ray tracing forms an image in a similar manner but typically for each point in the scene which contributes to the rendered image, the colour of that point is determined only from the light received at that point from the light sources in the scene (i.e. direct light only). Many variations of path and ray tracing are possible, including hybrid techniques which use path or ray tracing to determine the lighting to be applied to a conventional texture-mapped 3D scene.

In order to substantially reduce the number of calculations required to render an image using path or ray tracing techniques, light rays are typically traced backwards from the viewpoint to a light source. This avoids the overhead of performing calculations in respect of light rays which would not be seen at the viewpoint from which the output image is captured. The number of rays traced through the scene for each pixel in the output image is generally referred to as the number of samples per pixel, or SPP.

An illustration of a frame 112 being rendered by path tracing is shown in FIG. 1, which is a plan view of a 3D scene 100. In the scene, a nominal camera 101 is looking down a corridor 102 that includes a window 106 through which light enters from a light source—in this case, sun 103. The viewpoint of the camera is to be rendered as frame 112, with each pixel of the frame being determined by the totality of the light rays passing through that pixel. The corridor additionally includes columns 104 along wall 117 and a picture 105 on wall 118.

The scene could be a 3D scene defined in a computer game, with camera 101 representing the protagonist from whose point of view the game is played. In this example, the scene is defined at a computer system by a 3D model (e.g. a set of polygons defining the scene geometry) and texture information which can be applied to the 3D model. The 3D model defines the position and contour of the surfaces in the scene, and each texture defines the characteristics of the surface to which it is applied. For example, a texture will typically characterise the appearance of a surface in terms of its colours and patterning, and may also determine other properties such as its reflectivity, and the degree to which reflections from the surface are specular or diffuse.

Three exemplary light rays 108-110 are shown in FIG. 1, each of which originates from the source of light coming through window 106 and reflect off one or more surfaces of the scene before reaching the camera 101. Each of light rays 108-110 are identified however by tracing rays backwards from the camera 101 through pixels of the frame 112 at which an image of the scene is to be formed. Light ray 108 passes through pixel 114 and reflects off picture 105 whose paint imparts a colour to the ray, and causes diffuse reflection 127. Light ray 108 next encounters wall 117 which has a low reflectivity (leading to loss of brightness), a grey colour and causes diffuse reflection 128. The diffuse nature of reflections 127 and 128 can be modelled by picking the angle of reflections 121 and 122 at random (typically according to a Lambert's cosine law). In the case of reflection 128 this causes the light ray to be directed out of window 106. By considering the amount of light propagated along the path from the light source to the camera, the contribution from light ray 108 at pixel 114 can be determined: the substantially white light of a given intensity coming through window 106 becomes a dull grey as a result of reflection 128 and is then reflected by picture 105 with a colour change.

Light rays 109 and 110 each undergo a single reflection. Light ray 109 is traced back through pixel 115 to meet column 104 which is a polished pink marble that is of relatively high reflectivity, imparts a pink colour to the ray, and causes reflection 125. In contrast, light ray 110 is traced back through pixel 116 to meet wall 117 and hence is largely absorbed, imparted with a grey colour and undergoes a diffuse reflection. By reversing the paths of rays 109 and 110 and applying the properties of reflections 125 and 126 to the light rays entering through window 106, the contributions of those rays to pixels 115 and 116 can be determined. Typically light rays would be traced back from the camera only up to some predefined number of reflections; if a light source is not encountered within that number of reflections, the ray can be discarded.

By repeating the path tracing process for multiple rays through a pixel, each ray having a slightly different (possibly randomly-chosen) orientation through the pixel, a colour for the pixel can be established by averaging the results from all samples (e.g. according to Monte Carlo integration). By performing this process for each pixel of frame 112, the complete frame can be generated. Generated in this manner, the frame includes lighting information which results from the scene geometry, the location and characteristics of the light sources in the scene, as well as the texture information and surface characteristics for the surfaces present in the scene.

When only a relatively small number of light rays contribute to each pixel and the samples per pixel (SPP) is low, the level of noise in the rendered frame can be high. Increasing the number of samples per pixel increases the accuracy of the rendered frame and causes the level of noise in the frame to drop. However, increasing the number of samples per pixel significantly increases the time required to render the frame.

BRIEF SUMMARY OF THE INVENTION

According to a first aspect of the present invention there is provided a pixel filter comprising:
  an input arranged to receive a sequence of pixels, each pixel having an associated pixel value;
  a filter module arranged to perform a first recursive filter operation in a first direction through the sequence of pixels so as to form a first filtered pixel value for each pixel, and perform a second recursive filter operation in a second direction through the sequence of pixels so as to form a second filtered pixel value for each pixel, wherein the first and second recursive filter operations form a respective filtered pixel value for a given pixel in dependence on the pixel value at that pixel and the filtered pixel value preceding that pixel in their respective direction of operation, the filtered pixel value of the preceding pixel being scaled by a measure of similarity between data associated with that pixel and its preceding pixel; and filter logic configured to, for each pixel of the sequence, combine the first and second filtered pixel values formed in respect of the pixel by the first and second recursive filter operations so as to generate a filter output for the pixel.

The second direction may be opposite to the first direction.

The first and second recursive filter operations may be configured to scale the filtered pixel value of the preceding pixel such that its contribution to the filtered pixel value is greater when the measure of similarity is indicative of high similarity than when the measure of similarity is indicative of low similarity.

The first and second recursive filter operations may be configured to, for each pixel, form their respective first and second filtered pixel values by determining a difference between:
 a first intermediate value representing an output of the respective recursive filter operation when the respective filtered pixel value of the preceding pixel of the sequence is scaled by a first parameter; and
 a second intermediate value representing an output of the respective recursive filter operation when the respective filtered pixel value of the preceding pixel of the sequence is scaled by a second parameter.

The difference between the first and second parameters may be at least an order of magnitude smaller than the size of the either of the first and second parameters.

The input may be further arranged to receive a further sequence of pixels, the further sequence of pixels comprising at least one pixel value from the filter output, and the filter module is further arranged to perform the first and second recursive filter operations on the further sequence of pixels.

The sequence of pixels may represent a row of pixels selected from a rectangular array of pixels, and the further sequence of pixels represents a column of pixels selected from a rectangular array of pixels.

The sequence of pixels may represent a column of pixels selected from a rectangular array of pixels, and the further sequence of pixels represents a row of pixels selected from a rectangular array of pixels.

The filter module may be configured to, in forming a filtered pixel value for each pixel of the sequence, weight each pixel value by a measure of confidence in that pixel value.

Each pixel value and the measure of confidence in that pixel value may represent a coordinate set, and the filter module may be configured to concurrently operate on the components of each coordinate set so as to generate a filtered pixel value and filtered measure of confidence.

For each pixel of the sequence, the first and second recursive filter operations may further form a respective first and second filtered measure of confidence for the pixel in dependence on the measure of confidence in the pixel value and on the filtered measure of confidence formed for the preceding pixel of the sequence with respect to the direction of operation of the recursive filter, the filtered measure of confidence of the preceding pixel being scaled by the measure of similarity; wherein the first recursive filter operation is adapted to form the first filtered pixel value for each pixel in dependence on the first filtered measure of confidence for the pixel, and the second recursive filter operation is adapted to form the second filtered pixel value for each pixel in dependence on the second filtered measure of confidence for the pixel.

The filter logic may be configured to combine the first and second filtered pixel values for each pixel by calculating a weighted average of the first and second filtered pixel values, the weight of each filtered pixel value being formed in dependence on a measure of confidence in the pixel values which contributed to that filtered pixel value.

The pixel values may be generated by path or ray tracing and the measure of confidence of each pixel value prior to filtering being indicative of the number of light rays which contributed to that pixel value.

The filter module may comprise a recursive filter block configured to perform both the first and second recursive filter operations, such that the first recursive filter operation is performed in a first pass through the recursive filter block and the second recursive filter operation is performed in a second pass through the recursive filter block.

The pixel filter may further comprise a line store arranged to store the first filtered pixel value for each pixel, and wherein the filter logic is further arranged to combine the second filtered pixel values output from the recursive filter block with the first filtered pixel values stored in the line store.

The filter module may comprise a first recursive filter block and a second recursive filter block arranged to operate concurrently, and wherein the first recursive filter block is configured to perform the first recursive filter operation and the second recursive filter block is configured to perform the second recursive filter operation.

The pixel filter may further comprise a preliminary filter adapted to filter the pixel values so as to form a prefiltered pixel value for each pixel, and wherein the data associated with that pixel and its preceding pixel comprises, respectively, the prefiltered pixel value at that pixel and the prefiltered pixel value at the preceding pixel with respect to the direction of operation of the respective recursive filter operation.

The preliminary filter may have a filter radius at least an order of magnitude smaller than the first and second recursive filter operations.

The preliminary filter may be adapted to form a prefiltered pixel value at a pixel by forming a weighted mean of the pixel value and a predetermined set of pixel values adjacent to that pixel, the pixel value having a higher weight than the set of adjacent pixel values.

The recursive filters may have an infinite filter radius.

The recursive filters may be exponential filters.

Each recursive filter may include a preliminary filter arranged to form prefiltered pixel values for use at that recursive filter.

The pixels may represent a raster image rendered so as to represent a three-dimensional scene and wherein the data associated with that pixel and its preceding pixel comprises one or more of: a pixel characteristic; and a scene characteristic of the three-dimensional scene at the points represented in the image by the pixel and preceding pixel.

The raster image may represent lighting information for the scene but not texture information.

The scene characteristic may be one or more of: a vector describing scene geometry, a normal vector describing the orientation of a surface in the scene, and a scene depth representing a measure of distance of a surface in the scene from a defined reference point, line or plane.

The measure of similarity may comprise at least one of: a measure of the angle between normal vectors of surfaces in the scene represented by the pixel and preceding pixel; and a measure of the difference in scene depth between the surfaces in the scene represented by the pixel and preceding pixel.

The pixel characteristic may be one or more of colour, colour component, hue, saturation, brightness, lightness, luminance, and alpha.

Each pixel value may represent a luma or colour and the measure of similarity between data associated with that pixel and its preceding pixel may be a measure of the distance in colour space between the luma or colours represented by the pixel and preceding pixel.

The recursive filter may be configured such that each pixel and its preceding pixel are adjacent in the sequence of pixels.

Each sequence of pixels may represent a contiguous sequence of pixels.

The one or more recursive filter operations may be one or more of: instances of a software recursive filter; different filters embodied in hardware; and appropriately configured computation units of a GPU.

Each pixel value may comprise one or more colour components and/or a measure of luminance.

According to a second aspect of the present invention there is provided a method for filtering a sequence of pixels, each pixel having an associated pixel value, the method comprising:
    recursively filtering the sequence of pixels in first and second directions so as to form first and second filtered pixel values for each pixel by, for each pixel:
        reading a filtered pixel value for the preceding pixel of the sequence with respect to the direction of operation of the recursive filter;
        scaling the filtered pixel value of the preceding pixel of the sequence by a measure of similarity between data associated with the pixel and the preceding pixel; and
        forming a filtered pixel value for the pixel in dependence on the pixel value of the pixel and on the scaled filtered pixel value for the preceding pixel; and
    combining the first and second filtered pixel values formed in respect of each pixel of each sequence so as to generate a filter output for the pixel.

The second direction may be opposite to the first direction.

The scaling of a filtered pixel value of a preceding pixel may be such that its contribution to the filtered pixel value of the pixel is greater when the measure of similarity is indicative of high similarity than when the measure of similarity is indicative of low similarity.

The scaling of a filtered pixel value of a preceding pixel may comprising:
    scaling the preceding pixel by a first parameter; and
    scaling the preceding pixel by a second parameter;
and the forming of a filtered pixel value for the pixel comprising:
    forming a first intermediate value using the preceding pixel scaled by a first parameter;
    forming a second intermediate value using the preceding pixel scaled by a second parameter; and
    forming the filtered pixel value for the pixel by determining a difference between the first intermediate value and the second intermediate value.

The difference between the first and second parameters may be at least an order of magnitude smaller than the size of the either of the first and second parameters.

The method may further comprise:
    receiving a further sequence of pixels, the further sequence of pixels comprising at least one filter output; and
    filtering the further sequence of pixels in accordance with the method described herein so as to form a filter output for each pixel of the further sequence.

The sequence of pixels may represent a row of pixels selected from a rectangular array of pixels, and the further sequence of pixels may represent a column of pixels selected from a rectangular array of pixels.

The sequence of pixels may represent a column of pixels selected from a rectangular array of pixels, and the further sequence of pixels may represent a row of pixels selected from a rectangular array of pixels.

The forming a filtered pixel value for each pixel of the sequence may comprise weighting each pixel value by a measure of confidence in that pixel value.

Each pixel value and the measure of confidence in that pixel value may represent a coordinate set, and the recursively filtering may comprise concurrently operating on the components of each coordinate set so as to generate a filtered pixel value and filtered measure of confidence.

The recursively filtering may comprise, for each pixel of the sequence, forming a respective first and second filtered measure of confidence for the pixel in dependence on the measure of confidence in the pixel value and on the filtered measure of confidence formed for the preceding pixel of the sequence with respect to the direction of the recursive filtering, the filtered measure of confidence of the preceding pixel being scaled by the measure of similarity; wherein the first and second filtered pixel values for each pixel are formed, respectively, in dependence on the first filtered measure of confidence for the pixel and the second filtered measure of confidence for the pixel.

The method may further comprise forming a weight for each filtered pixel value in dependence on a measure of confidence in the pixel values which contributed to that filtered pixel value, and the combining the first and second filtered pixel values may comprise calculating a weighted average of the first and second filtered pixel values.

The pixel values may be generated by path or ray tracing and the measure of confidence of each pixel value prior to filtering being indicative of the number of light rays which contributed to that pixel value.

The method may further comprise prefiltering pixels so as to form a prefiltered pixel value for each pixel, and wherein the data associated with that pixel and its preceding pixel may comprise, respectively, the prefiltered pixel value at that pixel and the prefiltered pixel value at the preceding pixel with respect to the direction of operation of the respective recursive filter operation.

The prefiltering pixels may be performed with a filter radius at least an order of magnitude smaller than the filter radius used for recursively filtering.

The prefiltering pixels may be performed so as to form a prefiltered pixel value at a pixel by forming a weighted mean of the pixel value and a predetermined set of pixel values adjacent to that pixel, the pixel value having a higher weight than the set of adjacent pixel values.

Recursively filtering may be performed with an infinite filter radius.

There may be provided computer program code defining a filter as described herein, whereby the filter can be manufactured. There may be provided a non-transitory computer readable storage medium having stored thereon computer readable instructions that, when executed at a computer system for generating a manifestation of an integrated circuit, cause the computer system to generate a manifestation of a filter as described herein.

There may be provided computer program code for performing a method for filtering pixels of a frame in a graphical processing system. There may be provided a non-transitory computer readable storage medium having stored thereon computer readable instructions that, when executed at a processor, cause the processor to perform a method for filtering pixels of a frame in a graphical processing system.

BRIEF DESCRIPTION OF THE DRAWINGS

The present invention will now be described by way of example with reference to the accompanying drawings. In the drawings.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

There is provided a filter and method for filtering pixels of a frame in a graphical processing system, particularly for filtering out the noise developed by path/ray tracing techniques, whilst maintaining acceptable image quality. The method described herein is especially suitable for filtering noise in a raster light map.

Noise in rendered images may be smoothed out through the use of a conventional filter, such as a bilateral filter. Such filters can provide good quality images but are computationally expensive. Path and ray tracing is itself computationally complex and it can be challenging to implement in real-time, even if a hybrid approach is adopted where the path/ray tracing is used to provide lighting information for a rasterised scene. The use of complex filters to achieve acceptable image quality exacerbates the problem and makes it difficult to provide a real-time path tracing solution, especially on mobile platforms having limited processing resources.

Figure 5:
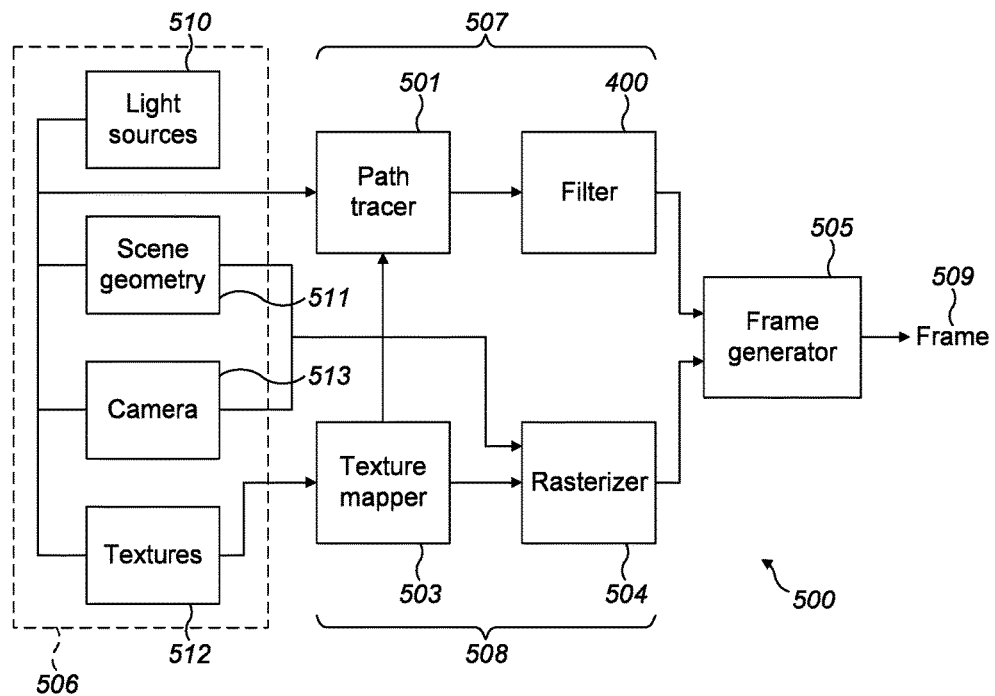
FIG. 5 is a schematic diagram of a graphics system comprising filter 400.

A filter will now be described with reference to an exemplary graphics system 500 which is shown in FIG. 5.

The system renders an output frame 509. The system could, for example, comprise a graphics processing unit (GPU) adapted to supported a rendering engine for a computer game. More generally the filter could be employed in any kind of graphical processing system and configured to perform filtering of any kind of raster graphics.

Graphics System

Graphics system 500 is configured to separately generate the lighting information for a 3D scene (data path 507 in FIG. 5) and form a raster image of the scene without any lighting information (data path 508). The system includes a memory 506 which holds datasets representing the scene geometry 511, the light sources in the scene 510 (e.g. their location and characteristics such as their colour), the textures of the surfaces 512 defined by the scene geometry, and the camera 513 (e.g. the location of a nominal camera in the scene from which point of view the output frame 509 is to be generated). Memory 506 is shown schematically in FIG. 5 as a single block but may in fact comprise one or more memories supported at the graphics system and/or external to the system—e.g. at a host system at which system 500 is provided. For example, system 500 could be a suitably programmed GPU supported at a host computer system with texture data 512 being held in the memory of the host system and in part at a texture buffer of the GPU.

Texture data path 508 includes a texture mapper 503 and a rasteriser 504. The texture mapper performs mapping of the textures 512 onto the surfaces defined by the scene geometry 511. This generates mapped texture data for the scene describing the texture at each sampled point on at least the visible surfaces of the scene. Rasteriser 504 generates a raster image of the texture-mapped scene from the point of view of the camera 513. In other words, the rasteriser projects the surfaces of the scene, complete with the textures applied to them, onto a raster image corresponding to the output frame 509 so as to generate a representation of the scene from the point of view of the camera 513. The raster image would typically have a predefined pixel resolution equal to or greater than that of the desired output frame 509.

Lighting data path 507 comprises a path tracer 501 and a filter 400 whose operation is described below. The path tracer may be configured to determine the lighting for the scene by tracing the paths of light rays through the scene from the camera 513 to the light sources 510 present in the scene. More generally, the path tracer may be configured to trace light N steps from the light source and/or M steps from the camera, with each step being a segment of the light path from the source or camera which extends between points of interaction in the scene (e.g. reflections from surfaces defined in the scene). If the path tracer traces in both directions (from the camera and source) the path tracer may continue until the paths can be connected so as to create a complete light path from source to camera. Path tracing performed in different directions may be filtered after being combined, or may be filtered independently and subsequently combined.

Path tracing is performed using the scene geometry 511 and texture information determined for each point of reflection in the scene from the mapped texture data generated by the texture mapper 503. Path tracer 501 is configured to calculate the path of each light ray through the scene from the camera to a light source in the same manner as described for the conventional path tracing approach described above in relation to FIG. 1. However, the path tracer 501 does not blend with the light ray the texture at the point where the light ray is last reflected before reaching the camera. Path tracer 501 instead generates a light map for the output frame from the light rays prior to their last reflection such that each pixel of the light map represents a colour to be blended with the raster image generated by rasteriser 504. The light map may include information expressing both intensity and colour of light in any suitable format (e.g. in an RGB or YUV representation), or may include information expressing only the intensity of light (e.g. represented by a Y value). The spatial resolution and/or number of bits used to represent each value may differ between channels. For example, an RGB 5:6:5 representation uses five bits for each of the red and blue channels, and six bits for the green channel. In another example, a YUV representation may use a higher spatial resolution for the Y channel than is used for the U and V channels.

The operation of path tracer 501 will now be described in more detail with reference to FIG. 1. We will consider light ray 110 first. In order to determine a contribution to pixel 116 in frame 112, the path tracer traces light ray 110 from the camera 101 through pixel 116 and identifies that it meets the surface of wall 117 at point 126. By looking up the material information for point 126 in information defining the properties of the surfaces in the scene, the path tracer determines that the light ray undergoes a diffuse reflection.

It is common for textures in conventional graphics rendering to characterise the appearance of a surface in terms of its colours and patterning. The texture data 512 may be extended to provide further material information, e.g. the reflectivity or refractive properties of the surface. The further material information may be stored with texture data 512, or held separately, e.g. elsewhere in memory 506. The process of determining material information for a surface at the point where a ray intersects the surface is similar to the process of determining colour information for a visible part of a surface in conventional rasterization. Therefore, texture mapper 503 may be used to determine material information for point 126 from textures 512. The material information may then be provided to path tracer 501 as part of the mapped texture data.

The path tracer thus selects an angle of reflection at random according to Lambertian reflectance. In this case, the angle of reflection happens to take the light ray out through window 106. The path tracer hence determines that the camera will see at pixel 116 of frame 112 the texture at point 126 directly illuminated by the light entering through window 106. Unlike in conventional path tracer systems, path tracer 501 does not apply the colour of the texture identified at point 126 to the characteristics of light received through the window. The contribution to pixel 116 of frame 112 by light ray 110 is instead given by the colour of the light incident at point 126. In the present example, frame 112 therefore represents a raster light map for the scene from the point of view of camera 101 and not a complete image of the scene.

Similarly, by tracing ray 109 through pixel 115 of frame 112, it is determined that the camera will see the texture at point 125 directly illuminated by the light from window 106. The contribution to pixel 115 of frame 112 by light ray 109 is therefore given by the colour of the light incident at point 125.

It can be seen that ray 108, which is traced from the camera through pixel 114, is reflected twice before meeting light source 103. The contribution to pixel 114 of frame 112 by light ray 108 is the colour of the light incident at point 127. This is not the colour of the light from light source 103, but is the light from light source 103 modified by diffuse reflection at 128, where the colour of the light ray is combined with the colour of the wall at point 128. This combination could be performed in any suitable manner, as appropriate to the colour space(s) in which the colours are defined and the lighting rules defined for the synthesised environment of the scene. Since wall 117 is a dark grey colour, the light from ray 108 incident at 127 is relatively weak. Ray 108 therefore has only a small contribution to pixel 114.

By repeating the above path tracing for a predefined number of light rays (samples) per pixel and over the pixels of the frame, a raster light map 112 of the scene from the point of view of the camera 101 is generated. The raster light map is then filtered by filter 400 in the manner described below so as to form a filtered light map for combination at frame generator 505 with the raster image generated by texture data path 508. In order to generate an output frame 509 of the desired pixel resolution which includes texture and lighting information, the frame generator 505 combines the colours of one or more pixels of the raster light map with the colours of one or more corresponding pixels of the raster image generated by texture path 508. The pixel dimensions of the raster light map could match the pixel dimensions of the raster image generated by texture path 508 such that the colour of each pixel of the raster image is combined with the colour of the corresponding pixel of the raster light map so as to generate the respective pixel of the output frame. The combination performed by the frame generator could be performed in any suitable manner, as appropriate to the colour space(s) in which the colours are defined and the lighting rules defined for the synthesised environment of the scene.

The graphics system described above is configured to determine a colour for each pixel of a raster light map; alternatively the graphics system could be configured to determine a luminance for each pixel of a raster light map but no colour information such as hue or saturation. This could be achieved by using the mapped texture data defined for each point in the scene at which a reflection occurs to determine the effect of the reflection on the luminance of the corresponding light ray but without modifying its hue and/or saturation.

Filtering

The operation of filter 400 will now be described with reference to the examples shown in FIGS. 4*a* and 4*b*.

Figure 4A:
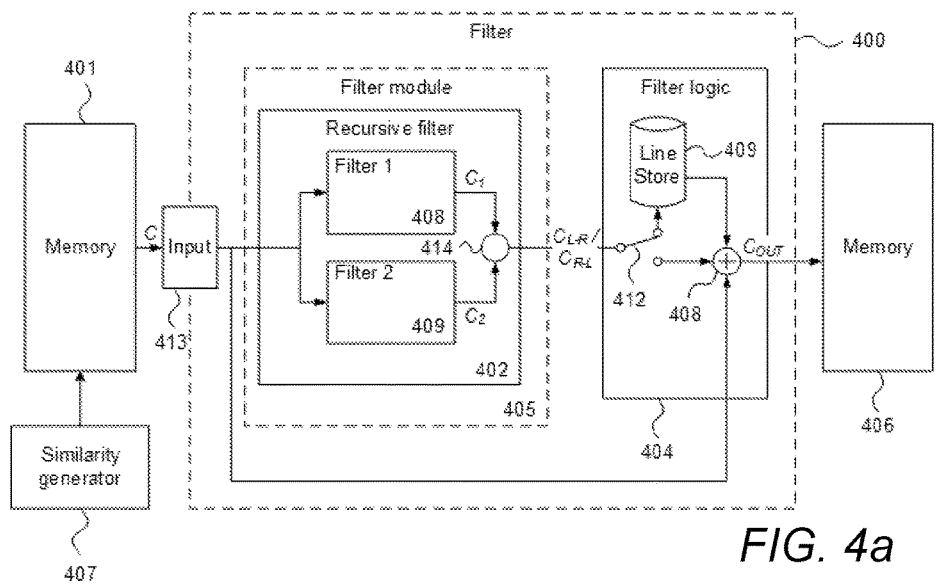
FIG. 4a is a schematic diagram of a filter 400 according to a first example.
Figure 4B:
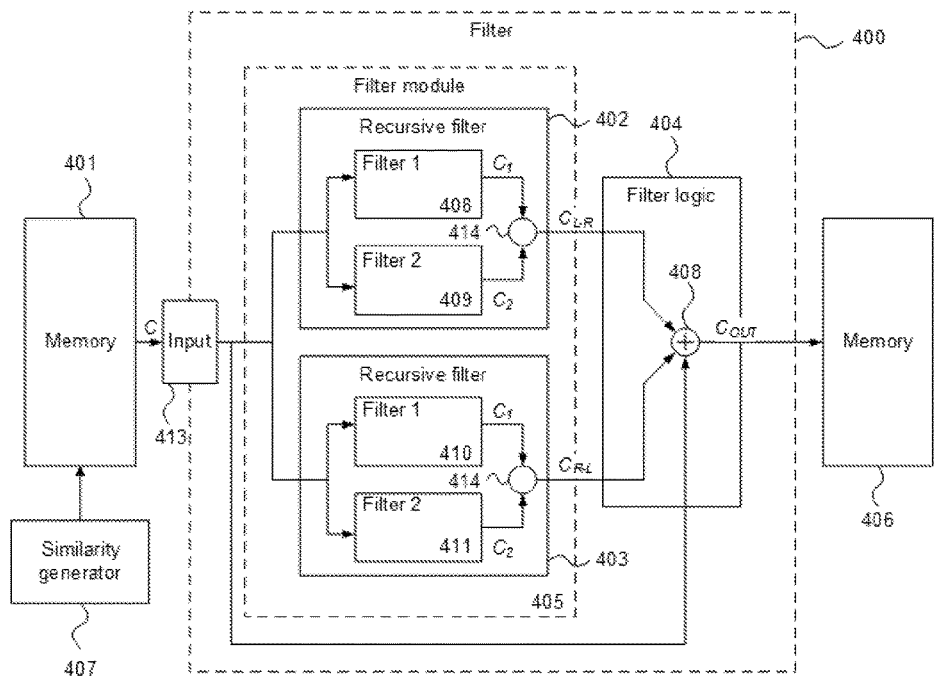
FIG. 4b is a schematic diagram of a filter 400 according to a second example.

FIGS. 4*a* and 4*b* each illustrate an example of a filter 400 adapted for operation on raster data held at a memory 401. Filter 400 could for example be configured to operate on frame 600 shown in FIG. 6 which comprises a plurality of pixels each having a pixel value. The pixel values could represent any kind of graphical characteristic, such as colour or luminance. Frame 600 could be any kind of raster graphic, such as a grayscale image, colour image or a raster light map. In the example described above with respect to FIG. 5, the frame 600 would be raster light map 112 generated by path tracer 501 of the graphics system.

Filter 400 comprises an input 413 for receiving pixel values from memory 401, a filter module 405 and filter logic 404. The filter module may comprise any number of recursive filters configured to operate in parallel or in series. Filter logic 404 operates to combine the filtered pixel values formed at the filter module into a filtered output which may be stored at a memory 406. The functions of filter logic 404 may be integrated with the filter module 405. Memories 401 and 406 may or may not be one and the same memory and could each comprise any number of data stores including, for example, registers, working memories and non-volatile memories.

FIG. 4a shows a first example of filter 400 which comprises a filter module 405 having a single recursive filter 402 configured to operate on raster data held at memory 401 so as to provide filtered pixel values to filter logic 404. In this example, pixels C of an incoming sequence are filtered in a first direction (e.g. left to right in accordance with equations 1-3 below) by recursive filter 402 to form filtered pixels $C_{L\text{-}R}$ and stored in line store 409. The pixels C of the incoming sequence are then filtered in a second direction (e.g. right to left in accordance with equations 4-6 below) by the same recursive filter 402 to form filtered pixels $C_{R\text{-}L}$. The pixels filtered in the first direction $C_{L\text{-}R}$ which are held at the line store 409 are combined with the pixels filtered in the second direction $C_{R\text{-}L}$ and the incoming pixels C at combination unit 408 of the filter logic 404 in accordance with equation 7 below so as to form filtered output $C_{OUT}$. Switch 412 schematically represents logic of the filter logic 404 configured to direct pixels filtered in the first direction to line store 409 and pixels filtered in the second direction to the combination unit 408 for combination with the pixels previously filtered in the first direction from line store 409. In this manner a single recursive filter may be used to perform filtering according to the principles set out herein.

FIG. 4b shows a second example of filter 400 which comprises a pair of recursive filters 402 and 403, each configured to operate on raster data held at memory 401 so as to provide filtered pixel values to filter logic 404. In this example, pixels C of an incoming sequence are concurrently filtered in a first direction (e.g. left to right in accordance with equations 1-3 below) to form filtered pixels $C_{L\text{-}R}$ by recursive filter 402 and filtered in a second direction (e.g. right to left in accordance with equations 4-6 below) by recursive filter 403 to form filtered pixels $C_{R\text{-}L}$. The pixels filtered in the first direction $C_{L\text{-}R}$ are combined with the pixels filtered in the second direction $C_{R\text{-}L}$ and the incoming pixels C at combination unit 408 of the filter logic 404 in accordance with equation 7 below so as to form filtered output $C_{OUT}$. The recursive filters 402 and 403 are arranged to operate in opposite directions on a sequence of pixel values. The sequence may be contiguous within frame 600 such that each pixel value in the sequence is adjacent in the frame to its immediately preceding and following pixel values in the sequence (with the possible exception of the pixel values lying at the start and end of the sequence).

As is described in more detail below, each recursive filter may comprise a pair of filters (e.g. recursive filter 402 comprises filters 408 and 409; recursive filter 403 comprises filters 410 and 411), with each pair being arranged to, at any given time, perform filtering in accordance with equations 1 and 2 or equations 4 and 5 below so as to generate the intermediate pixel values $C_1$ and $C_2$ for the respective filtering direction. The intermediate pixel values $C_1$ and $C_2$ formed at a recursive filter are combined at its combination unit 414 in accordance with equations 3 or 6 (as appropriate to the direction of operation of the filter) so as to form the respective filtered output $C_{L\text{-}R}$ or $C_{R\text{-}L}$.

In other examples, a recursive filter may comprise a single non-decaying filter such that the output of the recursive filter is the output of its non-decaying filter. For example, if recursive filter 402 in FIG. 4b were to comprise filter 408 only, then the output of the recursive filter may be given by equation (1) below. The outputs of such recursive filters could be combined at filter logic in accordance with equation (7) below in the same way as described with respect to the examples shown in FIG. 4b. The use of a single filter to perform recursive filtering is described in an example below in the discussion of optional "Prefiltering", where one of the filters of recursive filter 402/403 shown in FIG. 4b is used to perform recursive filtering and the other filter of is used to perform prefiltering.

The operation of filter 400 on a frame 600 will now be described in more detail by way of example. In frame 600, each of the rows and columns of pixels in the frame represents a possible sequence of pixels. However, other sequences are possible, including sequences defined within tiles of the frame (as illustrated for tile 611 in FIG. 6), and a single sequence defined for all of the pixels of the frame, as indicated by 612 in FIG. 6.

Filtering in a First Direction

Figure 6:
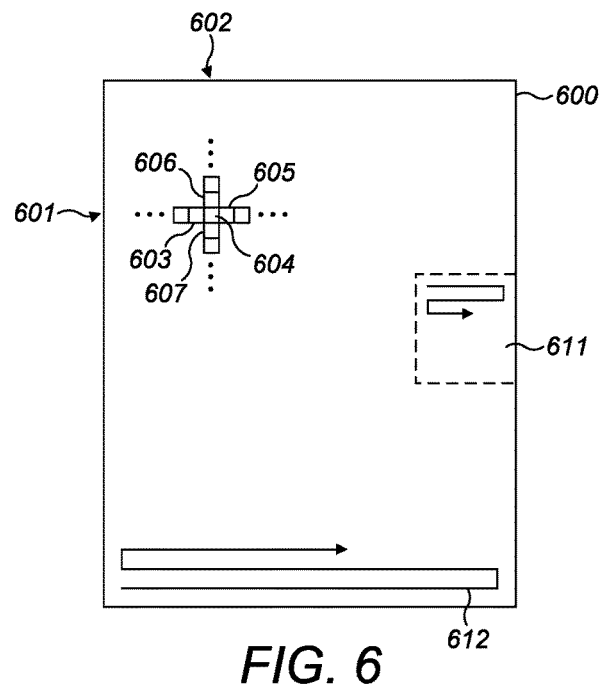
FIG. 6 illustrates filtering pixels of a frame.

Consider recursive filter 402 operating on pixel row 601 in frame 600. Filter 402 is configured to operate from left to right along sequence 601 in order to form a filtered value for each pixel from the value of that pixel and the filtered value of a preceding pixel in the sequence. In this example, filter 402 forms a filtered value for a pixel in dependence on contributions from two pixels but more generally the filter could form each filtered value in dependence on contributions from two or more pixels which may or may not be immediately adjacent to one another in the sequence. Thus, the filtered value for pixel 604 in FIG. 6 is formed from the value of pixel 604 and the filtered value formed for preceding pixel 603. Since the output of filter 402 in respect of pixel 604 depends on its output from its previous filtering step in respect of pixel 603, filter 402 is a recursive filter.

In the examples described below, the colours of pixels are represented using homogenous colour coordinates (their use herein can be considered to be analogous to the use of homogenous coordinates in geometry). A colour having 3 components (i.e. r, g and b) is represented using homogenous colour coordinates by a 4 component vector r, g, b, w, where w reflects the "weight" of the colour. The weight of a pixel could be, for example, a measure of the number of samples used to produce the colour value of the pixel. Alternatively, the weight of a pixel may be derived as a result of the use of the "multiple importance sampling" technique, which is known in path tracing, and which assigns a weight to each sample according to the sampling technique used. In general, the weight indicates some measure of the quality of, or confidence in, the value assigned to the pixel. One way to produce a homogenous colour value from an RGB colour and a weight is to multiply the 3 colour components with the weight, resulting in the homogenous colour vector {R*w, G*w, B*w, w}. To produce a 3 component vector from such a homogenous colour vector {r, g, b, w}, we would divide the colour channels by the weight, resulting in the colour vector {r/w, g/w, b/w}. This approach is used in the examples described below.

Using homogenous coordinates to represent colour has multiple advantages, as well as simplifying the mathematical equations (there is no need to update the colour and the weight separately). Using homogeneous coordinates may, for example, improve performance when filtering is implemented on a CPU or GPU, firstly by enabling the use of 4 component vectors that better utilize the vector instructions found in many processors, and secondly by allowing the costly division operations described below to be postponed to a single final step. When the path tracer accumulates samples during path tracing, it can be advantageous to configure the path tracer to not divide the accumulated colour by the number of samples. For example, in the simple case where samples do not carry individual weights the path tracer may accumulate vectors of the form {r, g, b, 1} for each sample (where r, g and b are the colour components for the samples) the final weight (w value) will reflect the number of samples accumulated. In other examples, where samples have individual weights, vectors of the form {r, g, b, w} may be accumulated in a similar way. In examples which only consider luma and not three-component colour, the equivalent homogenous {r, g, b, w} vector described above could be expressed as {l, w}, where l is the luma value of the samples.

Below we use the notation $C_m^n$ to represent filtered values. $C_m^n$ is a filtered homogenous colour value of the $n^{th}$ pixel (n is not to be confused with an exponent) in the sequence produced by filter m. It consists of a colour/intensity part $I_m^n$ and a weight $w_m^n$.

Recursive filter 402 is configured to form a first intermediate filtered value $C_1^n$ in respect of the $n^{th}$ pixel in the sequence having the pixel value $C^n$ by calculating:

$$C_1^n = \alpha_1 d^n C_1^{n-1} + C^n \quad (1)$$

where $\alpha_1$ is a constant and $d^n$ is a measure of similarity between the $n^{th}$ and $(n-1)^{th}$ pixels. Each pixel value thus receives a contribution from its preceding filtered pixel value, with that preceding filtered pixel value being decayed according to its similarity to the subject pixel value.

The first intermediate filtered value $C_1^n$ formed by recursive filter 402 could be used as the output of filter 402 for combination at the filter logic 404 with the corresponding first intermediate filtered value formed over the pixels of the sequence in the opposite direction. However, improved performance can be achieved if the recursive filter 402 is further configured to form a second intermediate filtered value $C_2^n$ respect of the $n^{th}$ pixel in the sequence having the pixel value $C^n$ by calculating:

$$C_2^n = \alpha_2 d^n C_2^{n-1} + C^n \quad (2)$$

where $\alpha_2$ is a constant and $d^n$ is the measure of similarity between the $n^{th}$ and $(n-1)^{th}$ pixels.

As shown in FIGS. 4a and 4b, recursive filter 402 may comprise two filters to form the two intermediate filtered values: a first filter 408 is arranged to calculate the first intermediate filtered value and a second filter 409 is arranged to calculate the second intermediate filtered value. The two filters 408 and 409 may operate in parallel so as to concurrently form the first and second filtered values. Similarly, additional recursive filters (e.g. 403) may comprise two filters 410 and 411 arranged to calculate first and second intermediate filtered values. One or more filters of a recursive filter may be exponential filters.

By operating the recursive filter 402 over the sequence of pixel values in accordance with equations (1) and (2), first and second intermediate filtered values can be calculated for each pixel in the sequence. Since the first value in the sequence will not generally have a preceding pixel value, the intermediate filtered value of the first pixel $C_1^n$ can be calculated using a weight of zero for the "preceding" pixel, or some suitable starting value appropriate to the frame and/or nature of the filtering to be performed. The weight coordinate is then updated in the same manner as the colour coordinates according to equations (1) and (2) such that the weight of a given pixel is the weight of the current pixel plus the weight of the preceding pixel scaled by $\alpha_i d^n$ (with i as appropriate to the equation). The constants $\alpha_1$, $\alpha_2$ and $d^n$ are chosen such that the quantities $\alpha_1 d^n$ and $\alpha_2 d^n$ lie between 0 and 1, the greatest value in that range indicating high similarity between the pixels and the lowest value in that range indicating low similarity between the pixels. Higher values of $\alpha_1$ and $\alpha_2$ will cause filter 400 to produce a smoother but more blurred output; this means less noise but can lead to soft shadow edges when the filter is configured to operate on a raster light map.

The first and second intermediate filtered values for each pixel are combined at the filter 402 (e.g. at a combination unit 414) to form a filtered pixel value $C_{L \to R}^n$ in the left-right direction by:

$$C_{L \to R}^n = \frac{\beta_2 C_1^n - \beta_1 C_2^n}{\alpha_1 - \alpha_2} \quad (3)$$

Where $$\beta_1 = 1 - \alpha_1$$

$$\beta_2 = 1 - \alpha_2$$

When the filter(s) generating the first and second intermediate filtered pixel values are exponential filters, the filter 402 may have an impulse response that is an approximation to a "half Gaussian", with the weights (the fourth coordinate of the homogenous system) reflecting an estimation of the number of accumulated samples. The "half Gaussian" describes a filter response that rises to a peak in a Gaussian fashion before falling abruptly. Since the value of $$\frac{1}{\alpha_1 - \alpha_2}$$

is a constant, it is not necessary to compute it during filtering. Further exponential filters may be used to improve the approximation to a Gaussian in the rising part of the response curve.

Filtering in a Second Direction

The operation of recursive filter 403 in FIG. 4b will now be described by way of an example of filtering in a second direction. It will be understood that the following description applies equally to recursive filter 402 of FIG. 4a when that single filter is configured for operation in a second direction over a sequence of pixels.

Recursive filter 403 is configured in an analogous manner to filter 402 but while filter 402 operates in a left to right direction, filter 403 operates from right to left over the same sequence of pixels in order to form a filtered value for each pixel from the value of that pixel and the filtered value of the preceding pixel in the sequence in the right-to-left direction. Thus, when operating on pixel row 601 in frame 600, the filtered value for pixel 604 in FIG. 6 is formed from the value of pixel 604 and the filtered value formed for preceding pixel 605. Again, more generally the filter 403 could form each filtered value in dependence on contributions from two or more pixels which may or may not be immediately adjacent to one another in the sequence.

Recursive filter 403 is configured to form a first intermediate filtered value $C_1^k$ in respect of the $k^{th}$ pixel in the sequence having the pixel value $C^k$ (where k=N−n, with N being the number of pixels in the sequence and n=0 being the leftmost pixel in row 601) by calculating:

$$C_1^k = \alpha_3 d^k C_1^{k-1} + C^k \quad (4)$$

where $\alpha_3$ is a constant and $d^k$ is a measure of similarity between the $k^{th}$ and $(k-1)^{th}$ pixels.

The first intermediate filtered value $C_1^k$ formed by recursive filter 403 could be used as the output of filter 403 for combination at the filter logic 404 with the corresponding first intermediate filtered value formed by recursive filter 402. However, improved performance can be achieved if the recursive filter 403 is further configured to form a second intermediate filtered value $C_2^k$ in respect of the $k^{th}$ pixel in the sequence having the pixel value $C_k$ by calculating:

$$C_2^k = \alpha_4 d^k C_2^{k-1} + C^k \quad (5)$$

where $\alpha_4$ is a constant and $d^k$ is the measure of similarity between the $k^{th}$ and $(k-1)^{th}$ pixels.

As shown in FIG. 4b, recursive filter 403 may comprise two filters to form the two intermediate filtered values: a first filter 410 arranged to calculate the first intermediate filtered value and a second filter 411 arranged to calculate the second intermediate filtered value. The two filters 410 and 411 may operate in parallel so as to concurrently form the first and second intermediate filtered values. One or more filters of a recursive filter may be exponential filters.

By operating the recursive filter 403 over the sequence of pixel values in accordance with equations (4) and (5), first and second intermediate filtered values can be calculated for each pixel in the sequence. Since the first value in the sequence will not generally have a preceding pixel value, the intermediate filtered value of the first pixel $C_1^{k=0}$ can be calculated using a weight of zero for the "preceding" pixel, or some suitable starting value appropriate to the frame and/or nature of the filtering to be performed. Each measure of similarity may take a value in a predefined range between 0 and 1, the greatest value in that range indicating high similarity between the pixels and the lowest value in that range indicating low similarity between the pixels.

The first and second intermediate filtered values for each pixel are combined at the filter 403 (e.g. at combination unit 414) to form a filtered pixel value $C_{R \to L}^k$ in the right-left direction by:

$$C_{R \to L}^k = \frac{\beta_4 C_1^k - \beta_3 C_2^k}{\alpha_3 - \alpha_4} \quad (6)$$

where $\beta_3 = 1 - \alpha_3$ $\beta_4 = 1 - \alpha_4$

When the filter(s) generating the first and second filtered pixel values are exponential filters, the filter 403 may have an impulse response that is an approximation to a "half Gaussian", with the weights (the fourth coordinate of the homogenous system) reflecting an estimation of the number of accumulated samples. The "half Gaussian" describes a filter response that rises to a peak in a Gaussian fashion before falling abruptly. Since the value of $$\frac{1}{\alpha_3 - \alpha_4}$$

is a constant, it is not necessary to compute it during filtering. Further exponential filters may be used to improve the approximation to a Gaussian in the rising part of the response curve.

In order to minimise the complexity of the recursive filters 402 and 403 it is preferable that they are configured to form an output in respect of a pixel in dependence only on the values of that pixel and the preceding pixel. This allows the $(n-1)^{th}$ value in a sequence to be discarded from working memory of the filter once the $n^{th}$ value in the sequence has been formed.

It is advantageous if each filter of a recursive filter is configured to form its first and second intermediate filtered values in a single pass. In other words, since the filters form each of their first and second intermediate filtered values for a pixel from the same two pixel values, it is preferable that the filters are configured to form both filtered values whilst the two required pixel values are local to the filter (e.g. held in registers at the respective filter following their retrieval from memory 401).

In other examples, the recursive filters 402 and 403 could be configured to form each filtered value in dependence on more than two pixel values.

Filter logic 404 is configured to combine the filtered pixel values $C_{L \to R}^n$ and $C_{R \to L}^n$ formed by filters 402 and 403 so as to generate a filtered output value for each pixel, $C_{out}^n$. The filter logic is configured to combine the filtered pixel values by calculating for each pixel of the frame 600 an average of the filtered pixel values $C_{L \to R}^n$ and $C_{R \to L}^n$. This could be a simple mean of the filtered pixel values but better filter performance can be achieved by forming a weighted average of the filtered pixel values using weights for the filtered pixel values derived from the weights of the pixels. Using homogenous colour coordinates, this may be achieved by performing a simple addition. This is possible in the examples in which weights are maintained by the recursive filters for each pixel. For example, good performance can be achieved by configuring the filter logic to generate a filtered output value according to:

$$C_{out}^n = C_{L \to R}^n + C_{R \to L}^n - C^n \quad (7)$$

We subtract the pixel value $C^n$ because we included it in the filtered values from both directions, so it was included twice.

In this manner, a filtered output value $C_{out}^n$ for each pixel in row 601 of frame 600 can be formed and stored at memory 406. By repeating the above steps over the rows of the frame, a new frame filtered in a first (e.g. horizontal) direction along the pixel sequences represented by the rows of the frame can be generated and held at memory 406.

Measures of Similarity

The measures of similarity used by the recursive filters 402 and 403 and the consequent behaviour of the filter 400 will now be described.

A measure of similarity for a given pixel represents some correlation between that pixel and a preceding pixel with respect to the direction of operation of the filter. For example, a measure of similarity for pixel 604 in FIG. 6 at recursive filter 402 when the filter is operating in a left to right direction along row 601 would be some measure of the correlation between a property of pixel 604 and a corresponding property of preceding pixel 603. A measure of similarity for pixel 604 in FIG. 6 at recursive filter 403 when the filter is operating in a right to left direction along row 601 would be some measure of the correlation between a property of pixel 604 and a corresponding property of preceding pixel 605. In other examples, the preceding pixel may not be the pixel immediately preceding the pixel at which filtering is being performed (e.g. the preceding pixel could precede by two or more pixels in the row or column being filtered). In the event that each filtered value is formed from more than two pixel values, there could be more than one measure of similarity formed for a pixel in respect of a correlation between that pixel and the two or more other pixels.

A measure of similarity between a given pair of pixels may be the same irrespective of the filtering direction or it may be different.

In the examples shown in FIGS. 4a and 4b, a similarity generator 405 is configured to form a measure of similarity for each pair of pixels which is independent of the filtering direction (and in the case described here, is formed in respect of adjacent pixels). The similarity generator calculates a measure of similarity for each pair of pixels such that the measures of similarity are available to the filter 400 during filtering. In other examples, a measure of similarity may be determined at the filter 400 during filtering—this may be useful in cases where the measure of similarity for a pair of pixels differs depending on the filtering direction. The similarity generator is shown schematically in FIGS. 4a and 4b and may or may not form part of the filter 400.

A measure of similarity could be generated on the basis of any suitable characteristics of the frame or other data relating to those pixels. For example, a measure of similarity could be formed for a pair of adjacent pixels in dependence on one or more of: a measure of the distance in colour space between the colours of those pixels; a measure of the difference in their luminance; a measure of the difference in the depth into a 3D scene of the respective surfaces which those pixels represent in an frame of that scene; and a measure of the angle between the normals of the respective surfaces which those pixels represent in an frame of a 3D scene. A measure of similarity would typically be chosen to be expressed as a positive value, e.g. a magnitude of some calculated quantity. The measure of similarity could be in the range [0, 1], with 0 indicating least similarity and 1 indicating most similarity.

Where depth information is available for the scene it is possible to use filter 400 to create a depth of field effect in a raster image instead of performing denoising. This can be achieved by varying the measure of similarity d (effectively altering the filter radius) of recursive filters 402 and 403 in dependence on the depth of each pixel representing a 3D scene relative to some defined focal plane.

In some examples the similarity generator is configured to form each measure of similarity from one or more characteristics of the pixels of the frame 600 which is being filtered. For instance, frame 600 could be an image frame in a graphics or camera pipeline which requires denoising, and the similarity generator could be configured to form a measure of similarity in dependence on one or more characteristics of adjacent pixels, such as their colour or luminance. For example, the similarity generator could calculate a measure of similarity in dependence on a distance in colour space between the colours of the adjacent pixels. With respect to the exemplary graphics system shown in FIG. 5, the image frame could be output frame 509 and filter 400 could be provided in the system following the frame generator 505 (additionally or alternatively to the filter 400 shown in FIG. 5).

In other examples the similarity generator can be configured to form each measure of similarity for a pair of adjacent pixels in dependence on other data relating to those pixels which is not present in the pixel values themselves. This can be appreciated by returning to the exemplary graphics system shown in FIG. 5. The system of FIG. 5 generates a frame 509 representing a 3D scene from the point of view of camera 513. The scene geometry is available at data store 511 and the light rays traced by path tracer 501 identify which area of which surfaces of the scene contribute to each pixel of the raster light map generated by the path tracer. In system 500, a normal vector for a pixel of the raster light map can be given by the normal vector to the area of the surface in the scene which contributes to that pixel. Similarly, a depth value for a pixel of the raster light map can be given by the depth in the scene of the area of the surface in the scene which contributes to that pixel. Techniques for calculating such normal vectors or depth in a 3D scene are well known in the art.

Where normal vector and/or scene depth information is available for the frame on which filter 400 operates, it is advantageous to use that information to form a measure of similarity between those pixels. This is typically possible when the frame represents a 3D scene, such as in the graphics system of FIG. 5. Making use of such underlying information about a scene to form the measures of similarity used in filter 400 enables the filter to perform filtering in dependence on whether or not adjacent pixels belong to a common feature of the scene (e.g. a common surface). This is generally preferred to forming the measure of similarity from the colour or luminosity of pixels because there can be instances where adjacent pixels in a frame happen to have the same colour/luminosity but in fact relate to different features of the underlying scene from which the frame is generated. There can also be instances where adjacent pixels in a frame relate to the same feature in a scene but have very different colours/luminosities due to surface decoration of that feature. In particular, making use of normal vector and/or scene depth information allows the filter to take object boundaries (e.g. edges between surfaces) into account when performing filtering. This can substantially improve the appearance of the resulting filtered frame and allows path traced lighting to be calculated for a scene at good quality using only a limited number of samples (rays) per pixel (SPP). Values as low as 4 SPP may be possible whilst maintaining reasonable quality. This makes path tracing possible on a wide range of consumer systems, including mobile devices with limited processing resources. Additionally forming the measure of similarity in dependence on the similarity of the luminance and/or colour of a pair of pixels in a light map can help to preserve shadow edges by causing a drop in the measure of similarity d when a shadow boundary is crossed (e.g. due to a large difference between the luma/colour pixel values of a pair of pixels lying either side of the shadow boundary).

Continuing the exemplary graphics system of FIG. 5, the similarity generator is configured to form a measure of similarity for adjacent pixels from the product of measures of (a) the angle between the normal vectors of the surfaces at the points in the scene represented by the pixels and (b) the difference between the depths of those points in the scene. Examples of these measures are illustrated in FIG. 1 in which pixels 115 and 116 of frame 112 are adjacent pixels. The angle between the normal vectors at points 125 and 126 in the scene (which contribute to pixels 115 and 116, respectively) is indicated by angle 150. A measure of angle 150 could be, for example, the angle itself, or a function of that angle such as its sine or cosine. The distance between the depths of those points in the scene is indicated by distance 151. A measure of the distance 151 between scene depths could be determined in any suitable units. It can be advantageous to represent scene depth as 1/d where d is the depth in the scene. This can speed up calculations performed with scene depth. In other examples a measure of similarity may be determined from more than two depth values, with a discontinuity in the rate of change of depth value being indicative of dissimilar surface orientations.

The similarity generator forms a measure of similarity d" between adjacent pixels in the frame 600 shown in FIG. 6

(which in this example can be the raster light map formed by path tracer 501 in FIG. 5) as follows:

$$d^n = d_{norm}^n d_{depth}^n \tag{8}$$

where $d_{norm}^n$ is a measure of the magnitude of the angle between normal vectors of the surfaces at the points in the scene represented by the $n^{th}$ and $(n-1)^{th}$ pixels in frame 600, and $d_{depth}^n$ is a measure of the magnitude of the difference between the depths of the points in the scene represented by the $n^{th}$ and $(n-1)^{th}$ pixels in frame 600.

The normal vectors for the surfaces of a scene and/or depth information for a scene can be derived from the scene geometry 511 available in the graphics system 500 shown in FIG. 5. The normal vectors for a scene and/or the scene depth values could be pre-calculated for the scene earlier in the graphics pipeline such that the necessary data is available to the similarity generator for calculation of $d^n$. This can save on the bandwidth required to access the scene geometry data 511 at the filtering stage.

In equations (1) and (2) above, it is advantageous if the values of constants $\alpha_1$ and $\alpha_2$ are selected such that the constants differ by an amount which is substantially smaller than the size of either of $\alpha_1$ and $\alpha_2$. Similarly, it is advantageous if the values of constants $\alpha_3$ and $\alpha_4$ in equations (4) and (5) above are selected such that the constants differ by an amount which is substantially smaller than the size of either of $\alpha_3$ and $\alpha_4$. For values of $\alpha_i$ which are of the order of 0.8, a difference of the order of 0.001 to 0.01 has been found to work well—e.g. the difference may be at least an order of magnitude smaller than the size of the values of $\alpha_1$. Through careful selection of the constants $\alpha_1$ and $\alpha_2$, $\alpha_3$ and $\alpha_4$ the "half Gaussian" responses of the two filters operating in different directions over the data combine such that filter 400 exhibits Gaussian characteristics but without requiring the substantial processing resources required to perform true Gaussian filtering. Filter 400 therefore offers a high speed and/or low power alternative to performing Gaussian filtering over the pixels of a frame.

Figure 7:
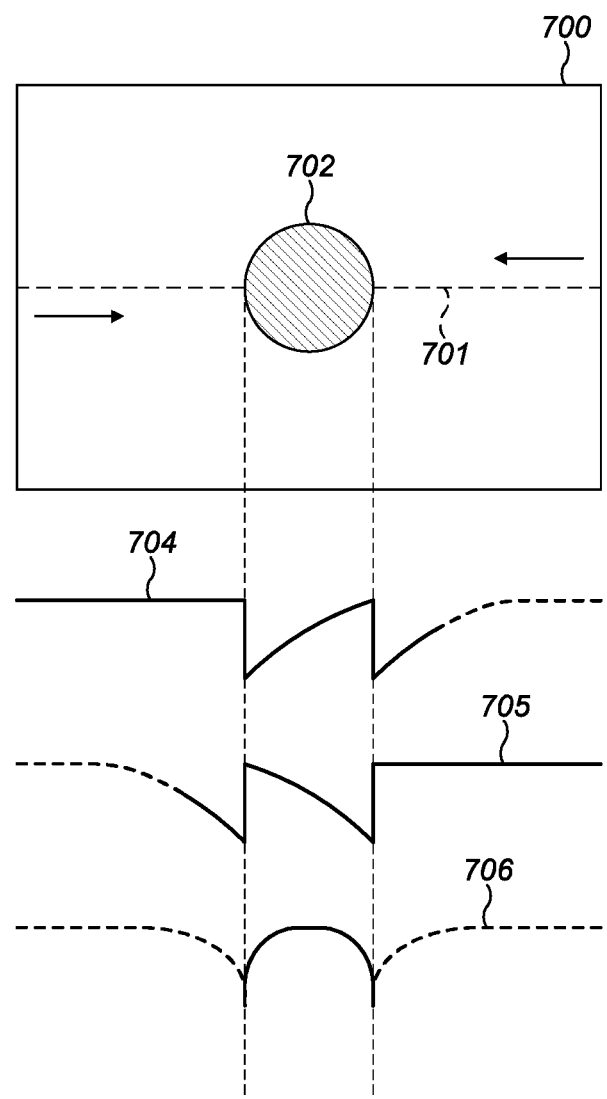
FIG. 7 illustrates filtering performed by filter 400.

The operation of the filter 400 is illustrated in FIG. 7 by way of a simple example. FIG. 7 shows a frame 700 depicting a red sphere 702 suspended in an otherwise plain white frame on which filter 400 is configured to operate. In this example the filter 400 is configured to operate on the red colour channel values of the pixels and the measures of similarity are calculated for each pair of adjacent pixels on the basis of the depth in the scene of the points in the scene represented by those pixels. Recursive filter 402 operates over the pixels of row 701 in the frame from left to right so as to generate filtered pixel values 704 for the row. Similarly, recursive filter 403 operates over the pixels of row 701 in the frame from right to left so as to generate filtered pixel values 705 for the row.

The filtered value of each pixel as generated by the recursive filters depends on the filtered value of the preceding pixel with respect to the direction of operation of the filter, and the filtered value of that preceding pixel in turn depends on the filtered value of its preceding pixel. The red colour of the pixels depicting the red sphere are therefore smoothed out in the direction that each of the recursive filters operates. This can be appreciated from the curves shown in FIG. 7 which illustrate the weight of the accumulated sample values: filter 402 operates from left to right as shown in curve 704, and filter 403 operates from right to left as shown in curve 705. The similarity measure $d^n$ between adjacent pixels ensures that the red colour of the sphere is not mixed into the white background and the shape of the sphere blurred. This is because the similarity measure between pixels on either side of the edge of the sphere will be close to zero so as to cause the filter to effectively restart filtering as it passes the boundary. This would be true whether the similarity measure is based on the similarity of surface normals, scene depths or colours of adjacent pixels.

By summation of weight values 704 and 705, filter logic 404 generates weight values 706 which will be symmetric if the measures of similarity $d^n$ used by the recursive filters are equivalent for each adjacent pair of pixels and if the recursive filters 402 and 403 start with the same weights for the pixels of row 701. It can be seen that the weight values are high and relatively constant across the width of object 702, meaning that the output of the filter will be derived from the average of several pixel values. This is true even at the edges of object 702, showing that the filter is able to filter effectively up to the edge of the object, but with the similarity measure preventing the blurring of the colour of object 702 into background 700.

Figure 1:
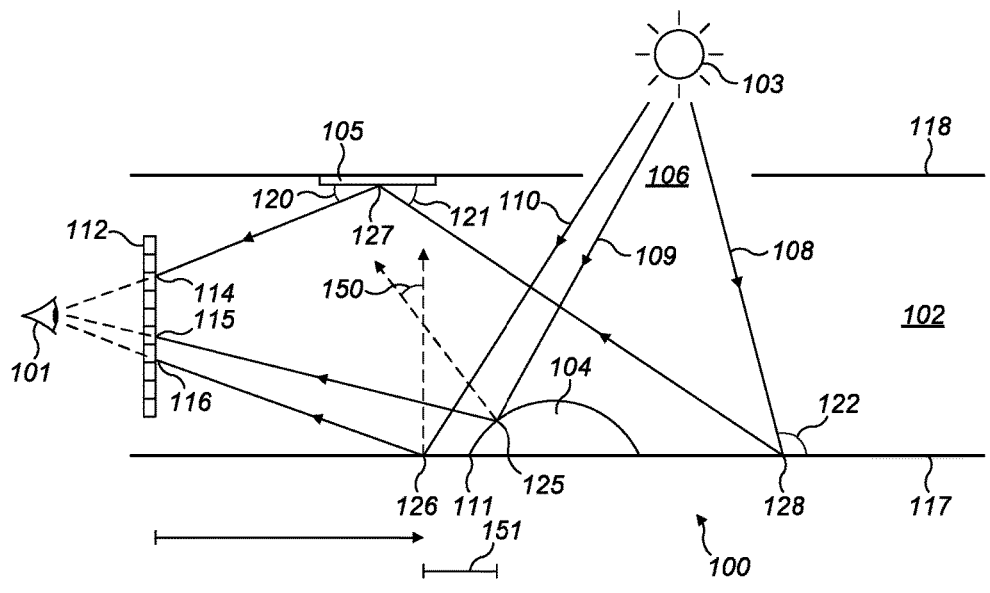
FIG. 1 illustrates a plan view of a three-dimensional scene 100 and the path of light rays through the scene.
Figure 2:
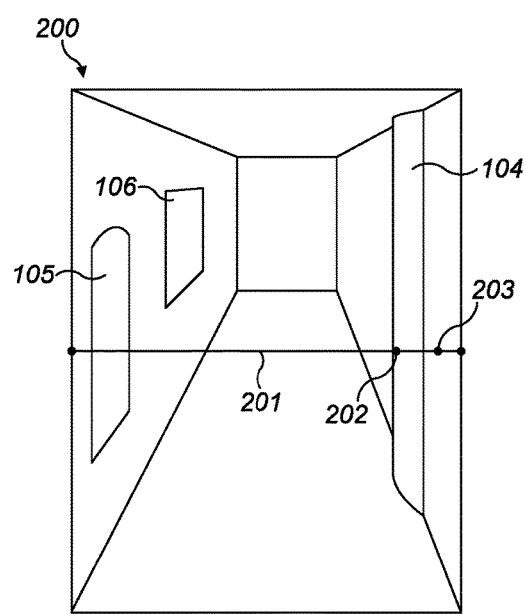
FIG. 2 is a raster light map of scene 100 from the point of view of camera 101.

A more complex example is illustrated by FIGS. 2 and 3 which relate to the scene 100 shown in FIG. 1. FIG. 2 is an example of a raster light map 200 generated by path tracer 501 of the graphics system 500 of FIG. 5 for the scene shown in FIG. 1 and from the point of view of camera 101. Each of the pixels of the raster light map 200 represents the illuminance received at that pixel from one or more path traced light rays directed to the camera 101 defined for the scene. As has been discussed, each of the pixels could express the illuminance it receives as, for example, a colour or a luminance pixel value.

FIGS. 3a-3g show a series of plots illustrating the filtering of pixel values along row 201 of the raster light map from pixel 202 to pixel 203. In the Figures the pixel values are luminance values (e.g. the luma or Y value of each pixel where the raster light map is defined in the YUV colour space). Line 301 is a plot of the unfiltered pixel values of the raster light map between pixels 202 and 203 which can be seen to include a substantial amount of noise due to a low number of samples per pixel being performed by path tracer 501. The segment of pixel values from pixel 202 to pixel 203 can be seen from FIG. 2 to pass from pixels representing the light rays received from a polished marble column 104 to pixels representing the light rays received from dark grey stone wall 117. The transition between the two surfaces occurs at edge 111 shown in FIGS. 1 and 2 and, in a perfect rendering of the scene, would correspond to the true underlying drop in pixel value indicated by plot 302 in FIG. 3a.

The presence of edge 111 indicates that the similarity between pixels either side of the edge will be low. This is illustrated by line 303 in FIG. 3b which is a plot of a measure of similarity along the segment of pixel values from pixel 202 to 203. For example, consider the case when the similarity of adjacent pixels is determined by the angle between the surface normals of those pixels. The angle between the normals of the pixels either side of edge 111 in FIG. 2 will be roughly 90 degrees (one pixel will represent part of column 104 and one pixel will represent part of wall 117). The measure of similarity could, for example, be chosen to be cos θ where θ is the angle between the normals such that an angle of around 90 degrees between the surface normals at the points represented by adjacent pixels will result in a similarity measure of close to zero.

Figure 3A:
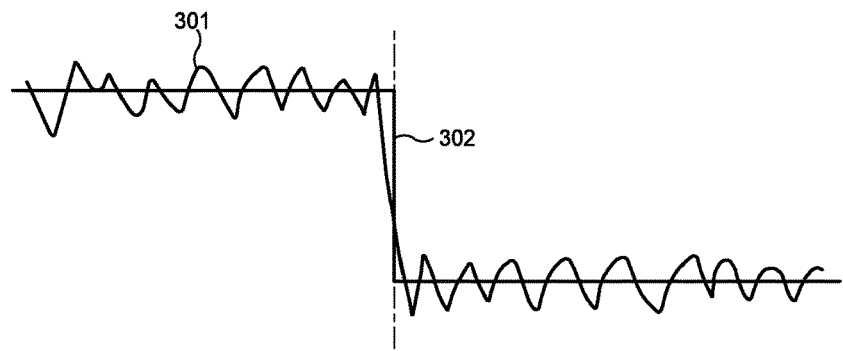
FIGS. 3a-3g show plots illustrating filtering of pixel values between points 202 and 203 in FIG. 2.
Figure 3B:
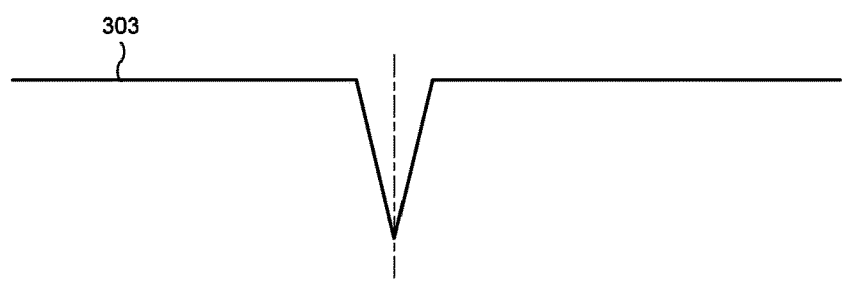
Figure 3C:
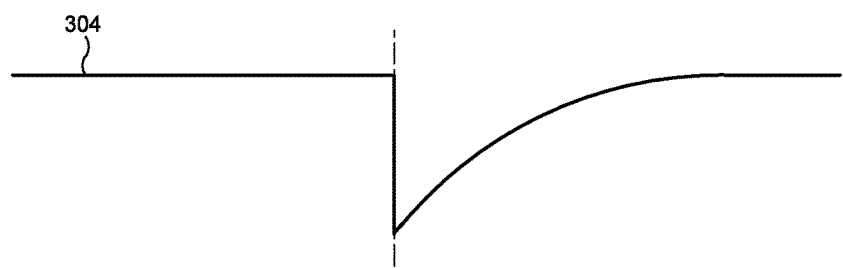
Figure 3D:
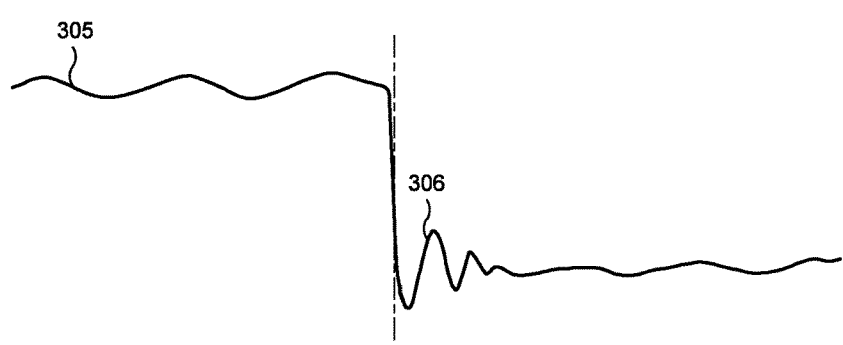
Figure 3E:
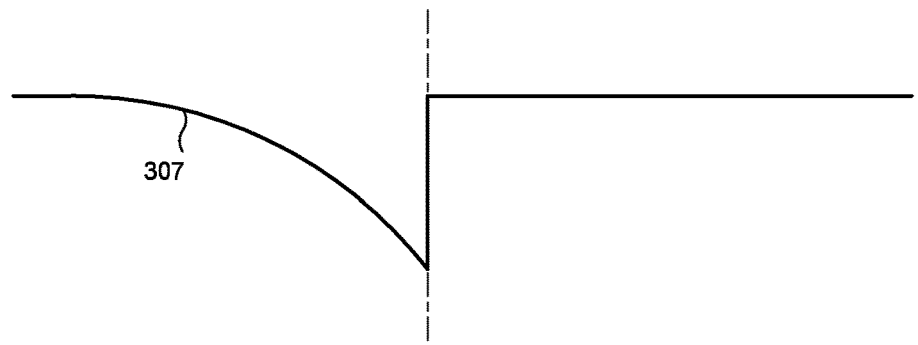

The drop in the measure of similarity across edge 111 causes the pixel weights calculated with respect to filtering in the L-R direction (in accordance with equations 1-3) to drop abruptly in the manner shown by line 304 in FIG. 3c. Similarly the pixel weights calculated with respect to filtering in the R-L direction (in accordance with equations 4-6)

drop abruptly in the manner shown by line 307 in FIG. 3e. The effect on the filtered pixel values formed in the L-R and R-L directions in shown in FIGS. 3d and 3f.

Line 305 in FIG. 3d is a plot of the filtered luminance values which are generated in the L-R direction by recursive filter 402 of the filter 400 in accordance with the principles described herein (e.g. equations 1-3). Filtered line 305 can be seen to have smoothed-out much of the noise present in line 301. Furthermore, because the filtering performed by recursive filter 402 uses the normal vector and depth information available for scene 100, the filtered line 305 can be seen to closely follow the true underlying luminance in the scene without pushing the high luminance values of the pixels which receive light rays reflected from the marble columns into the lower luminance values of the pixels which receive light rays from the darker wall. Most of the noise prior to the crossing of edge 111 has been removed by the filtering but, after the edge is crossed with respect to the direction of operation of the filter, some noise 306 remains. This is a result of the filter being 'reset' by the drop in similarity values and hence a lower smoothing contribution from adjacent pixel values (see equations 1 and 2).

Figure 3F:
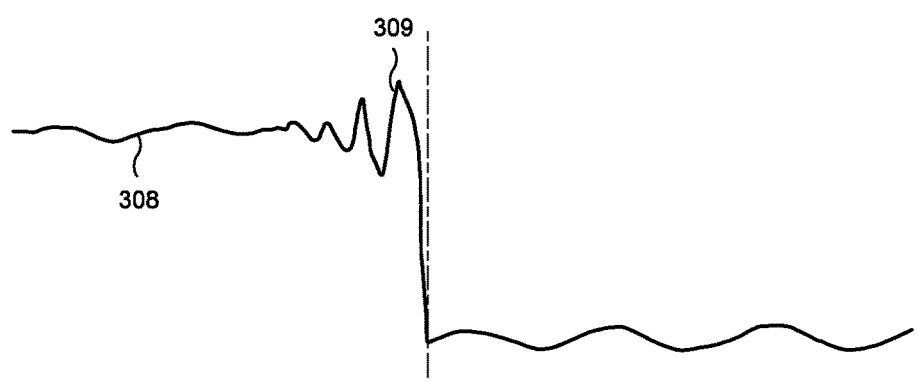

Line 308 in FIG. 3f is a plot of the filtered luminance values which are generated in the R-L direction by recursive filter 403 of the filter 400 in accordance with the principles described herein (e.g. equations 4-6). Line 308 displays the same characteristics as line 305, but with the noise 309 following the filter 'reset' caused by low similarity across edge 111 occurring after the edge with respect to the filter direction and therefore to the left of the edge.

Figure 3G:
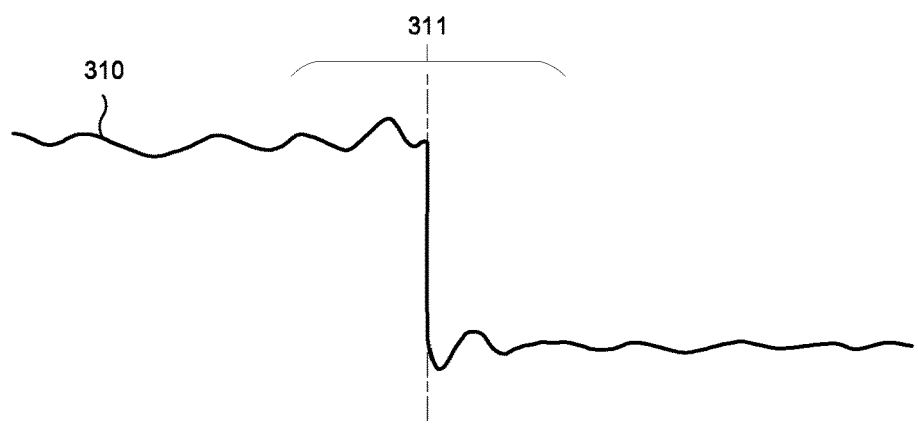

Line 310 in FIG. 3g is a plot of the filtered output of filter 400 generated at filter logic 404 by combining the filtered pixel values formed at recursive filters 402 and 403. It can be seen that most of the noise 306 and 309 in FIGS. 3d and 3f is attenuated in the output 310 so as to generate a smooth filtered output in region 311 which accurately tracks the underlying drop-off in luminance values due to edge 111. This is because the noise region 306 corresponds to a region of low weight in plot 304 and noise region 309 corresponds to a region of low weight in plot 307. Thus the noisy signal from recursive filter 402/403 is suppressed with the cleaner signal from the other filter of the pair dominating in the output 310.

Returning to the example shown in FIG. 5, it is particularly advantageous if the filter 400 is arranged to perform filtering on a raster light map generated by path tracer 501 prior to its combination at frame generator 505 with the raster image generated by rasteriser 504. For a given required sharpness of output frame 509, this allows filter 400 to be configured to perform a greater degree of smoothing—e.g. through choosing higher values for the constants of equations (1), (2), (4) and (5)—than would be possible if filter 400 were instead arranged to operate on image frame 509 which comprises both lighting and texture information. In other words, a greater degree of denoising can be performed without blurring the textures contributed by the raster image. This allows good performance to be achieved whilst using only a low number of samples per pixel (e.g. 4) at path tracer 501. Further filtering, either using a conventional filter or using the filtering technique described here, could be performed on the raster image prior to its combination with the raster light map at frame generator 505, or on the final image at the output of frame generator 505. For example, filtering to introduce blur based on depth of field could be performed.

Pixel Weights

The use of pixel weights ensures good performance of the filter because it enables the filter to operate with knowledge of the confidence that the value of a pixel (e.g. its colour or luminance) is correct. In the examples described herein, pixel weights are provided as the fourth coordinate of a homogenous coordinate system based on the colour components of pixels, but in other examples pixel weights could be handled separately to the colour components of a pixel as a parameter of each pixel. Roughly speaking, the use of pixel weights also provides the filter with a measure of the effective number of pixels averaged since the last edge was crossed (when the similarity factor would have to some extent reset the weight coordinate) when the recursive filtering is being performed. Pixels having a low weight make a lower contribution to the accumulated average than pixels having a high weight. For example, a pixel having a weight of 70% may only contribute 70% of its colour (say) to the accumulated average. Such a pixel may be represented in the pixel weight as 0.7 of a pixel. A pixel having a weight of 100% may be counted as a full pixel.

The weight of a pixel could be any suitable measure of the quality of, or confidence in the accuracy of the pixel's value. For example, in the case of a noise reduction filter, the weight of a pixel may be in inverse proportion to the expected noise contribution from that pixel. Each weight would typically take any positive value. Through the use of suitable weights, filter 400 allows pixel values in which there is a high confidence to influence neighbouring pixels more than pixel values in which there is a low confidence. This behaviour can be appreciated from equations (1), (2), (4) and (5) above.

The weight of a pixel could be a measure of the number of light rays which contributed to its pixel value. Alternatively or additionally, the weight of a pixel could be a measure of noise in the pixel, with a higher weight corresponding to lower noise—such a parameter could be determined for a pixel from, for example, a statistical analysis of the variance in pixel values of a group of pixels that includes the pixel of interest (e.g. the row/column being filtered) or which belong to a common feature in an underlying 3D scene. Alternatively, the weight of each pixel of a frame to be filtered could initially be set at the same value for all pixels—e.g. as the value "1", or as some measure of average noise in the frame.

In the present example, the initial weight of a pixel is a measure of the number of light rays which contributed to its pixel value. In one example, the initial weight of a pixel could be arranged to take a value between 0 and 1. For example, if path tracer 501 is configured to attempt to trace 4 samples per pixel (SPP), then the weight of each pixel could be given by the ratio of the number of light rays which actually contribute to the pixel value to the number of samples per pixel—i.e. if 3 light rays contributed to a given pixel and the path tracer is configured to operate with an SPP of 4, then the weight of that pixel would be 0.75. Some traced light rays will not contribute to the value of a pixel. In other examples, the initial weight of a pixel could take any positive value representing the number of samples which contribute to the pixel—e.g. 3 in the preceding example. Information identifying the number of samples contributing to each pixel could be provided to filter 400 by path tracer 501 and held at memory 401.

The initial weights determined for the pixels of the frame are filtered in the same manner as the colour or luma coordinates as described by equations (1) to (7) above. For example, considering the weight coordinate alone, the recursive filter 402 (e.g. at filter 408) would be configured to update the initial weight $w^n$ of the $n^{th}$ pixel according to:

$$w_1^n = \alpha_1 d^n w_1^{n-1} + w^n \quad (10)$$

where $\alpha_1$ is a constant, $d^n$ is a measure of similarity between the $n^{th}$ and $(n-1)^{th}$ pixels, and $w_1^{n-1}$ is the first intermediate filtered weight of the $(n-1)^{th}$ pixel.

Similarly, recursive filter 402 (e.g. at filter 409) would be configured to update the initial weight $w^n$ of the $n^{th}$ pixel according to:

$$w_2^n = \alpha_2 d^n w_2^{n-1} + w^n \quad (11)$$

where $\alpha_2$ is a constant, $d^n$ is a measure of similarity between the $n^{th}$ and $(n-1)^{th}$ pixels, and $w_2^{n-1}$ is the second intermediate filtered weight of the $(n-1)^{th}$ pixel.

The first and second intermediate filtered weights for each pixel may be combined at recursive filter 402 (e.g. at combination unit 414) to form a filtered weight $w_{L \to R}^n$ in the left-right direction by:

$$w_{L \to R}^n = \frac{\beta_2 w_1^n - \beta_1 w_2^n}{\alpha_1 - \alpha_2} \quad (12)$$

where $\beta_1 = 1 - \alpha_1$ $\beta_2 = 1 - \alpha_2$

In an analogous fashion, filtered weights may be formed in the right-left direction in accordance with equations 4 to 6. Such filtering could be performed, for example, at recursive filter 403. The filtered weights so formed may then be combined in accordance with equation 7 at filter logic 404 above to give an output filtered weight for each pixel:

$$w_{out}^n = w_{L \to R}^n + w_{R \to L}^n - w^n \quad (13)$$

The first and second weights deviate from one another during operation of the recursive filter due to the different values of $\alpha_1$ and $\alpha_2$. In order to minimise copying between the filter and memory 401, the first and second intermediate weights of a pixel are preferably updated by recursive filter 402 when it forms the first and second intermediate filtered pixel values for that pixel and whilst the required data is present in the working memory/registers of the filter.

The resulting pixel weights from equation (13) may be stored at memory 406 for subsequent use.

Filtering Sequences of a Further Orientation

In order to avoid introducing artefacts into a frame filtered by filter 400 in a first direction (along its rows in the examples above), it is advantageous to subsequently filter the frame in the same manner as described above over sequences having a second orientation (e.g. along its columns of pixels). This second stage filtering could be performed by a second filter configured analogously to filter 400 described above, or filter 400 could be configured to perform both the first and second stage filtering in any suitable manner (e.g. consecutively). The second stage filtering will now be described with reference again to FIG. 6.

In examples described above, filter 400 forms filtered output pixel values $C_{out}^n$ for the pixels of frame 600 on a row-by-row basis and stores those output values at memory 406. The output pixel values $C_{out}^n$ generated, for example, in accordance with equation (7) represent frame 600 filtered along its rows. The output pixel values generated as the output of the filtering performed in a first direction (e.g. in the horizontal direction) are preferably used as the starting point for filtering over pixel sequences of frame 600 having a second orientation—in this example along columns of pixels of the frame. The output pixel values include the output weights generated for the weight coordinate according to equation (7). In other examples, the same initial pixel values and weights can be used as the inputs for filter 400 or a second filter configured analogously to filter 400, with a final output frame being produced by blending together the filtered images produced by filtering over pixel sequences of the two orientations.

By providing the output pixel values $C_{out}^n$ as inputs to filter 400 in place of the unfiltered pixel values $C^n$, and configuring filter 400 to perform filtering over the columns of frame 600, filter 400 can be arranged to generate a final filtered frame whose pixel values have been filtered in both first and second orientations. This approach can eliminate the artefacts seen when filtering in a single orientation only (such as horizontal streaking in the output frame) and can achieve excellent filtering performance. Under this approach, $C_{out}^n$ is used in place of $C^n$ in the equations given above. The same or different constants could be used by filter 400 in equations (1) to (11).

With respect to FIG. 6 and equations (1) to (11), left can become up and right can become down in the above equations and explanations, or vice versa. For example, consider filtering along column 602 of frame 600. Recursive filter 402 can be configured to filter in an up-down orientation along the pixel sequences represented by the columns of the frame such that, under the operation of filter 402, pixel value 604 receives a contribution from pixel value 606 in accordance with equations (1) to (3). Recursive filter 403 can be configured to filter in a down-up orientation along the pixel sequences represented by the columns of the frame such that, under the operation of filter 403, pixel value 604 receives a contribution from pixel value 607 in accordance with equations (4) to (6). In performing filtering along the columns of frame 600, the filter 400 can perform denoising of the previously filtered pixel values in a second up-down orientation which is orthogonal to the right-left orientation of the previous filtering stage.

In this manner, a final filtered output value $C_{final}^n$ for each pixel of frame 600 can be formed for use as the filtered output frame generated by the filter 400. The final filtered output value $C_{final}^n$ for a pixel is given by the output of equation (7) as performed by the filter logic 404 during the second stage filtering over the second orientation and where the input pixel values for the second stage were the output pixel values $C_n^{out}$ from the first stage filtering:

$$C_{final}^n = C_{U \to D}^n + C_{D \to U}^n - C^n \quad (15)$$

where "L-R" has been replaced with "U-D" to reflect that in the second stage filtering is performed in frame 600 in an up-down orientation along the pixel sequences represented by the columns of the frame.

In the example shown in FIG. 5, the output frame comprising the pixel values $C_{final}^n$ would represent the filtered raster light map used by frame generator 505 to generate the output frame 509. Pixel values represented using homogeneous colour coordinates may be converted to a conventional representation (e.g. three component R, G, and B) before output or further processing by dividing each component by the weight value w.

Unweighted Filtering

In alternative embodiments, filter 400 could be configured to perform filtering without the use of weights (e.g. the pixel values C do not include pixel weights and nor are separate weights provided which describe the confidence in the colour values of a pixel). This results in noisier filtered images but can reduce the complexity of the filtering and potentially improves the speed/reduces the processing requirements of the filter. Performing filtering in accordance with the principles described herein without using weights requires some modification of the equations given above.

Using the definitions of $\alpha_1$, $\alpha_2$ and $d^n$ above, the following new constants are defined:

$$\beta_1 = 1 - \alpha_1 d^n$$
$$\beta_2 = 1 - \alpha_2 d^n$$
$$\gamma_1 = \frac{(\beta_2)^2 - (\beta_2)^4}{(\beta_2)^2 - (\beta_1)^2}$$
$$\gamma_2 = \frac{(\beta_1)^2 - (\beta_2)^4}{(\beta_2)^2 - (\beta_1)^2}$$
$$\delta = \frac{\beta_1 \gamma_1 - \beta_2 \gamma_2}{2}$$
$$\varepsilon = \frac{1}{1 - \delta}$$

$\gamma_1$ and $\gamma_2$ are used to create a Gaussian-like convolution function. $\delta$ reflects the contribution of a current pixel to the combined pixel value resulting from filtering the pixel in the two directions, with that contribution being subtracted from the combined pixel value. $\varepsilon$ is a correction factor chosen such that the average of the filtered signal closely matches the average of the original.

Equation (1) above then becomes:

$$C_1{}^n = \alpha_1 d^n C_1{}^{n-1} + \beta_1 C^n$$

And equation (2) becomes:

$$C_2{}^n = \alpha_2 d^n C_2{}^{n-1} + \beta_2 C^n$$

As a result, the combination of the pixel values from first and second filters in analogy to equation (3) becomes:

$$C_{L \to R}{}^n = \gamma_1 C_1{}^n - \gamma_2 C_2{}^n$$

And the combination of the pixel values from the first and second filters in analogy to equation (7) becomes:

$$C_{out}^n = \varepsilon \left( \frac{C_{L \to R}^n + C_{R \to L}^n}{2} \delta C^n \right)$$

Analogous equations can be used if filtering is performed in a second direction and the output of the filters operating in the different directions can be combined in any of the ways described above in the weighted example.

Filter 400 could be configured to operate on any suitable pixel values, including, for example: colours expressed in an RGB or YUV format; one or more components of colours such as a value of a particular colour channel (e.g. the red channel of an RGB colour space); and a luminance value such as luma (e.g. the Y component of a YUV colour space). If filtering is separately performed for one or more colour channels of a frame, the filtered colour components of each pixel could be combined so as to form a filtered colour frame.

The filtering of a frame described herein could be performed on a tile-by-tile basis for a frame divided up into a plurality of overlapping or non-overlapping tiles.

Filter 400 could be embodied in hardware, software, or any combination of the two. Graphics system 500 could be embodied in hardware, software, or any combination of the two. In one example, the recursive filters and/or filter 400 are provided as code for execution at a graphics processing unit (GPU). Multiple code instances could be supported at the GPU so as to provide multiple filters arranged to operate in parallel on sequences of pixels of a frame so as to perform filtering of that frame. Code could be provided to appropriately configure computation units of a GPU to perform the filtering described herein.

Figure 8:
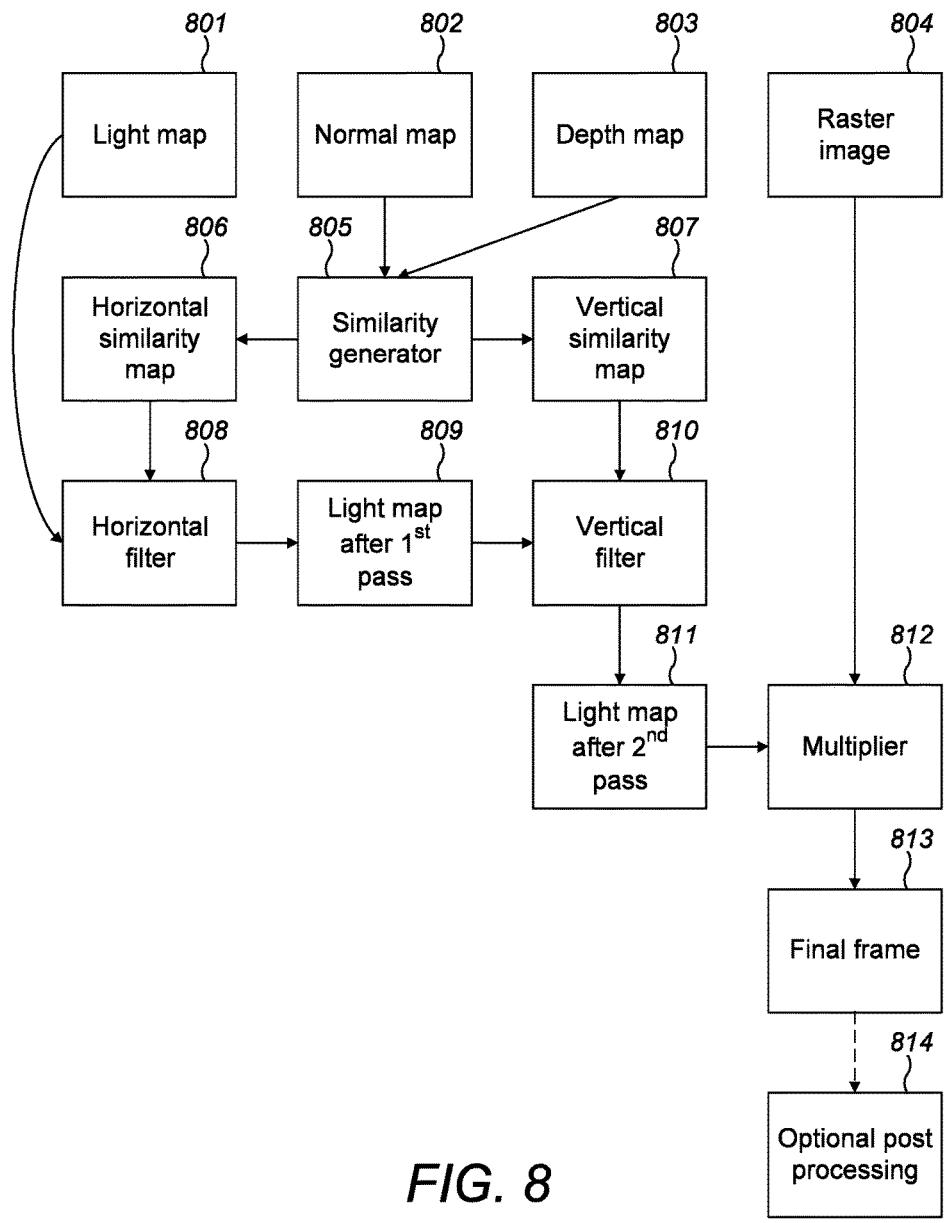
FIG. 8 shows an exemplary structure for data and functional elements of filter 400 operating at a graphics system.

An exemplary structure for data and functional elements of filter 400 operating at a graphics system is shown in FIG. 8. Several maps are generated for use by the filter based on the input pixels of the scene to be filtered:

a light map 801 which describes the colour/luminance of the input pixels of the scene due to light sources in the scene—this could be generated, for example, by path tracer 501 in the manner described herein;

a normal map 802 which describes the normal vector of each input pixel—this could be generated, for example, at the path tracer 501 or rasterizer 504 from the scene geometry;

a depth map 803 which describes the inverse depth of each input pixel—this could be generated, for example, at the path tracer 501 or rasterizer 504 from the scene geometry;

a raster image 804 which describes the initial colour of each pixel before lighting is applied—this would typically be produced by texture mapping and rasterization (e.g. by texture data path 508 in FIG. 5);

horizontal/vertical similarity maps which describe the similarity between horizontal/vertical pixels according to the chosen measure of similarity—these could be generated at a shader.

These maps may be generated such that each map is available to the filter at the appropriate time. The maps could be generated concurrently.

In the present example, the measure of similarity is that defined in equation (8) above and depends on the normal and depth values of adjacent pixels. A similarity generator 805 operates on the normal and depth maps 802 and 803 so as to generate the horizontal similarity map 806 and the vertical similarity map 807. The similarity generator could run at a shader of the graphics system. Horizontal filter 808 corresponds to filter 402 shown in FIG. 4b and operates on the light map 801 and horizontal similarity map 806 so as to form an updated light map 809 after filtering in the horizontal orientation (the first pass).

Vertical filter 810 corresponds to filter 403 shown in FIG. 4b and operates on the updated light map 809 and vertical similarity map 807 so as to form an updated light map 811 after filtering in the vertical orientation (the second pass). Light map 811 is the output light map of filter 400 and is combined with the appropriate pixel colours from raster image 804 at multiplier 812 so as to form a final frame 813 which represents the texture-mapped scene from the point of view of the nominal camera and to which lighting has been applied by path tracing. Various forms of post-processing 814 may be performed on the final frame.

A colour can be any characteristic relating to the appearance of a pixel in a frame, including one or more parameters describing: a colour of a pixel described according to some colour model (e.g. an RGB or YUV tuple); one or more components of a colour of a pixel (e.g. a red channel parameter); an aspect of a colour such as its luminance, saturation, brightness, lightness, hue, or alpha. Black, white and shades of grey are colours. A pixel value can be a colour.

A pixel can be any element of a raster frame having an associated pixel value which conveys information about the appearance of the frame. A frame is made up of an ordered set of pixels. For the purposes of the present disclosure, a pixel need not be related to the screen resolution of a frame. For example, a frame might have a screen resolution of 1280×960 first elements but the alpha information of that frame might only be defined to a resolution of 640×480 second elements; if it is the alpha information being filtered then the alpha values of the 640×480 second elements of the frame represent the pixel values and the second elements the pixels.

Figure 9:
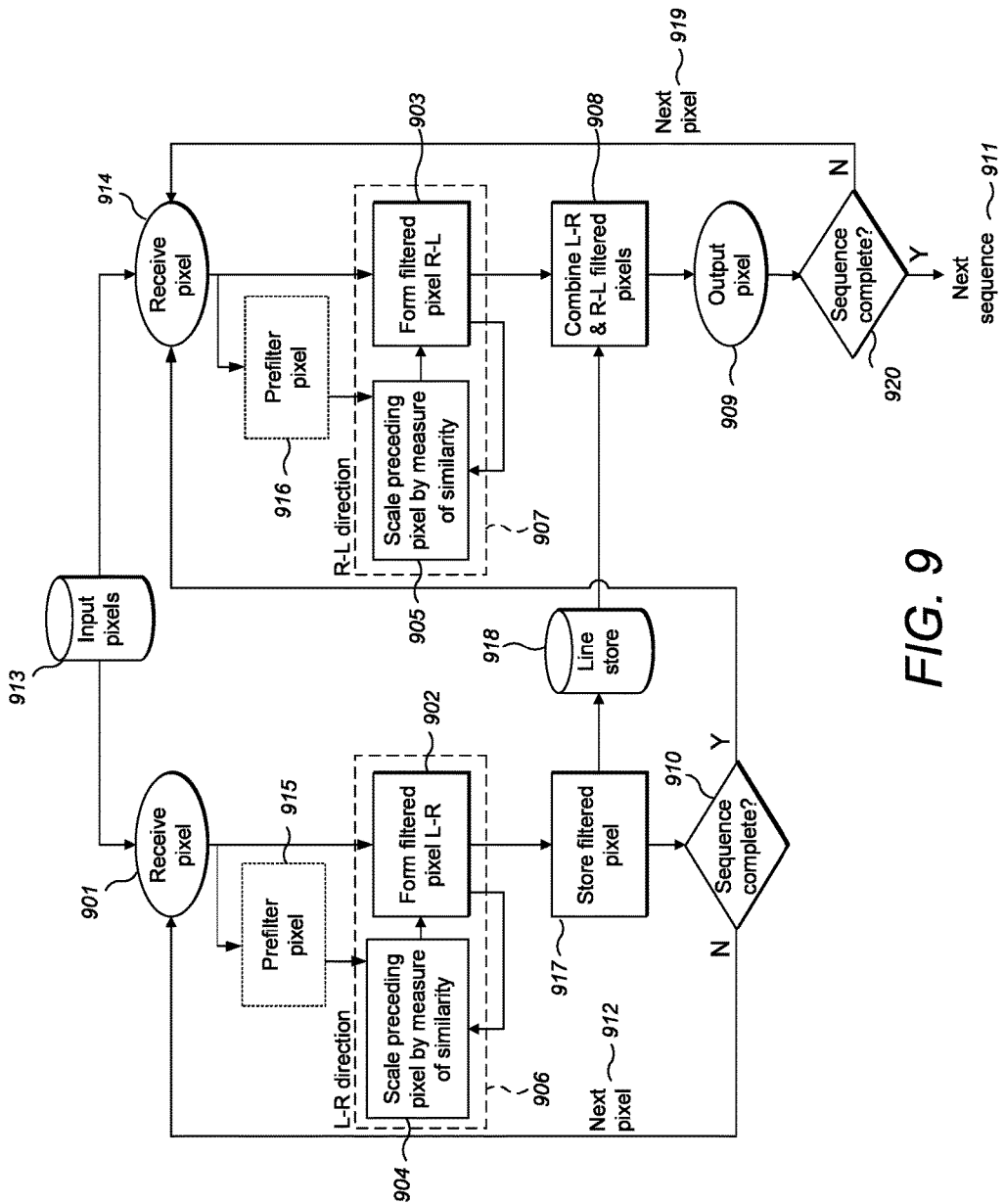
FIG. 9 is a flowchart illustrating the operation of filter 400.

FIG. 9 is a flowchart illustrating the operation of filter 400 as shown in FIG. 4a on a sequence of pixels (e.g. a row or column) of a frame. For each pixel of a sequence, the filter forms a filtered pixel value in the left to right direction 902 and a filtered pixel value in the right to left direction 903. Each filtered pixel value is formed in dependence on the value of the received pixel (e.g. its initial colour information) and the value of the preceding pixel scaled as shown by steps 904 and 905 by a measure of similarity between the pixel and its preceding pixel in the sequence. For example, filtering in the left to right direction 906 could be performed in accordance with equations (1) to (3) such that two intermediate filtered values $C_1^n$ and $C_2^n$ are formed and combined at step 902 in accordance with equation (3) to form a filtered value for the pixel in the left to right direction, $C_{L \to R}^n$. Similarly, for example, filtering in the right to left direction 907 could be performed in accordance with equations (4) to (6) such that two intermediate filtered values $C_1^k$ and $C_2^k$ are formed and combined at step 903 in accordance with equation (6) to form a filtered value for the pixel in the right to left direction, $C_{R \to L}^k$.

Filtering in the left to right direction 906 is performed on a received pixel 901 which may be selected from a store of input pixels 913. Once the filtered pixel value has been formed in the left to right direction 902, the filtered pixel value may be stored 917—for example at a line store 918. Each received pixel 901 is a pixel in a sequence of pixels (e.g. a row or column of a frame). Each pixel of a sequence may be processed in order such that when a pixel in a sequence has been processed, the next pixel 912 in the sequence is then received for filtering until all of the pixels of the sequence have been filtered in the left to right direction.

Once filtering of a sequence of pixels is complete in the left to right direction, that sequence may be processed in the right to left direction with the pixels of the sequence being received 914 from the store of input pixels 913 in the appropriate order.

The filtered pixel values formed in the left to right and right to left directions are combined at step 908 so as to form an output pixel value 909. The left to right filtered value for a given pixel may be read from line store 918. The combination of filtered pixel values could be performed, for example, in accordance with equation (7). More generally, the combination could be an average of the left to right and right to left filtered values, such as a mean. The output pixel value 909 could, for example, represent the colour of the respective pixel following filtering. As discussed above, each pixel value could further comprise a weight, which may represent a measure of confidence in the pixel characteristics expressed in the initial pixel value—e.g. the initial colour of the pixel as determined by path tracing.

At 920, the filter checks whether the pixel sequence is complete in the right to left direction (e.g. whether the filtered pixel is the last pixel in a row or column of the frame). If it is, the filter 400 begins filtering the next sequence of the frame until all the sequences of the frame have been filtered and hence filtering of the frame is complete. If the pixel sequence has not been completed, the next pixel 919 in the sequence is received for filtering. When all of the pixels of the sequence have been filtered in the right to left direction, the filter may move onto the next sequence 911 of the frame.

In other examples, filtering in the right to left direction may be performed first, and the results stored. Filtering in the left to right direction may then be performed, and the results combined with the stored results from the right to left filter to produce output pixels.

As indicated by optional prefilter steps 915 and 916 in FIG. 9, filter 400 may perform prefiltering on received pixel values. Such prefiltering will now be described. Prefiltering may be used with any configuration of filter 400, including with any of the examples of filter 400 described herein.

Prefiltering

In examples in which the measure of similarity d for a pair of pixels is formed in dependence on the similarity of those pixel values, it can be advantageous to prefilter the pixel values prior to their use in forming the measure of similarity. A pixel value could be, for example, a measure of luminance or colour of a pixel (where the colour of a pixel may refer to one or more of its colour components). The use of prefiltering improves denoising at shadow edges at the expense of some blurring of sharp shadows. The measure of similarity for a pair of pixels may additionally be formed in dependence on the similarity of other pixel characteristics, such as a measure of the difference in the depth into a 3D scene of the respective surfaces which those pixels represent in an frame of that scene, and/or a measure of the angle between the normals of the respective surfaces which those pixels represent in a frame of a 3D scene.

In the examples described above, a first recursive filtering of pixels in a first direction is performed in accordance with equation (1):

$$C_1^n = \alpha_1 d^n C_1^{n-1} + C^n$$

where $\alpha_1$ is a constant and $d^n$ is a measure of similarity between the $n^{th}$ and $(n-1)^{th}$ pixels. Analogous filtering is performed using a measure of similarity in accordance with equations (2), (4) and (5). Each such filtering will benefit from using a measure of similarity calculated using prefiltered pixels characteristics in the manner described below.

In order to form a measure of similarity $d^n$ in dependence on the luma or colour similarity of those pixel values, the pixel values of the $n^{th}$ and $(n-1)^{th}$ pixels are compared. The $(n-1)^{th}$ pixel value is available in filtered form as output of the recursive filter operated on the previous pixel but no equivalent filtered form of the $n^{th}$ pixel is available. If the $n^{th}$ pixel is not filtered then noise present in the initial pixel values can lead to noise in the measure of similarity.

To address the noise problem in the initial pixel values, in the present example, the pixel value $C^n$ of the current $n^{th}$ pixel may be prefiltered so as to smooth out noise present in that initial pixel value. The prefiltered pixel values are used in the formation of a measure of similarity and may optionally also be used by the recursive filters in place of the initial unfiltered pixel values $C^n$. The prefiltering may be performed in any suitable manner and over one or more components of the pixel value or parameters representing the pixel value in the calculation to form the measure of similarity. For example, if the measure of similarity is formed by calculating a distance in colour space between the colour values of a pair of pixels, then the one or more components of the current pixel value which contribute to that distance may be prefiltered; if the measure of similarity is formed by calculating a difference in luminance between a pair of pixels, then at least a parameter representing the luminance of the current pixel is prefiltered (e.g. a luma component of the current pixel value). Prefiltering may be performed only on the parameter representing a characteristic of the pixel value or on those components of the current pixel value which are used in the calculation of the measure of similarity. It will be understood that references herein to prefiltering of a pixel are references to prefiltering at least those components/parameters of or representing the pixel which are used in the calculation of the measure of similarity.

Prefiltering of pixel characteristics using the calculation of a measure of similarity may be performed at any suitable type of filter, such as a Gaussian or exponential filter. It is preferable that a filter used to prefilter the current pixel has a small filter radius. For example, a filter radius of 3×3 pixels has been found to provide good performance. The radius of a filter is a measure of the width of the filter function describing the filter—for example, it may be a measure of the area about each pixel or number of pixels which contribute to a given filtered pixel value. Filter radius may be expressed in any suitable manner, including: as a measure of the width of the filter function represented by the filter (e.g. the full width at half maximum of the filter function); and as a measure of the greatest distance in the frame between two pixels which contribute to the filtered value generated for a subject pixel.

Prefiltering may comprise taking a simple average (e.g. a mean) of the relevant pixel values or characteristics of the pixels lying within the filter radius (e.g. those nine pixels lying in a 3×3 square grid with the current pixel at the centre). Prefiltering may comprise calculating a weighted average of pixels lying within the filter radius, the weights of the pixels being defined according to some predetermined distribution (e.g. the current pixel being assigned a higher weight than its 8 adjacent pixels in a 3×3 square grid so as to approximate a Gaussian or other filter envelope centered on the current pixel).

Alternatively, prefiltering may be performed by using a recursive filter similar to the filter described by equation 1, with a short exponential response (i.e. having a relatively small $\alpha$ value) and without using a measure of similarity. Such a recursive filter performs prefiltering in one dimension, unlike than the two dimensional (e.g. 3×3) filters described above.

In the examples described above, an additional filter may be provided to perform pixel prefiltering. Such an additional filter could be provided, for example, at filter 400 of FIG. 4*a* or 4*b*.

In the example described above with respect to FIG. 4*a*, a filter is provided having a single pair of filters (filter pair 408 and 409 of recursive filter 402). In the example described above with respect to FIG. 4*b*, a filter is provided having a pair of filters operating in each direction (filter pair 408 and 409 of recursive filter 402, and filter pair 410 and 411 of recursive filter 403). It can be advantageous to perform prefiltering using the arrangement shown in either FIG. 4*a* or 4*b* and without introducing any additional filters. This minimises the complexity of the design. This will now be described in more detail with respect to FIG. 4*b*.

For example, a first filter of the filter pair of each of the recursive filters 402 and 403 could be used to perform prefiltering of pixels (e.g. filters 408 and 410), with the second filter of the filter pair of each of recursive filters 402 and 403 being used to perform recursive filtering (e.g. filter 409 may perform recursive filtering in accordance with equation (1) and filter 411 may perform recursive filtering in accordance with equation (4)). The first filters arranged to perform prefiltering may be configured to have a small filter radius in comparison to the second filters. For example, the filter radius of the first filters may be at least an order of magnitude smaller than the filter radius of the second filters. To preserve detail in the frame (e.g. light map or raster image) the filter radius of the first filters may be no more than 20, no more than 15, no more than 10, no more than 5, no more than 3, or no more than 2 pixels. The second filters may have an infinite filter radius—for example, the second filters may be exponential filters (which with a decay of 1 would represent a simple accumulator).

The filtered value for each pixel (e.g. the output of filter logic 404) may be calculated as a simple mean of the filtered output for each pixel in the first and second directions from the recursive filters 402 and 403 (optionally minus the pixel value itself which has been counted twice). In examples which use prefiltering of pixels, pixel weights as described above may or may not be used which allow the filter to take into account the confidence in the value of a pixel. If pixel weights are used, the calculation of a mean becomes a simple sum according to equation (7) above. This is because the weight values accumulate over the pixels during filtering, just as the pixel values do themselves and a homogenous colour vector {r, g, b, w} represents a colour vector {r/w, g/w, b/w} in colour space.

Provided that the first filters have a small filter radius, this filtering arrangement can yield good performance, especially for noisy images—this is true even though filtering is only performed once in each direction and even when the second filter radius is infinite.

Prefiltering may be performed in two-dimensions (e.g. over a 3×3 square grid) or in one dimension (e.g. over a line of 3 pixels in the direction in which filtering is to be performed).

In combination with calculating a measure of similarity in dependence on the similarity of the normals and/or depth values of adjacent pixels, further calculating the measure of similarity in dependence on the similarity of the pixel values of the adjacent pixels enables filtering to be performed whilst preserving shadow boundaries as well as edges separating two differently-oriented surfaces and/or boundaries between features at different depths in the scene. The use of prefiltering further improves denoising close to shadow boundaries.

In the example shown in FIG. 9 in which prefiltering steps 915 and 916 are performed, on receiving a pixel of a sequence 901, the filter 400 is further configured to prefilter received pixels values 901 and 914. The prefiltered pixel value is used in generating the directional measures of similarity which scale the 'preceding' pixels at 904 and 905. In the particular example shown in FIG. 9, the filtering may be performed at 902 and 903 using the initial pixel value of the received pixel and not its prefiltered pixel value. This helps to maintain detail in frames processed by the filter whilst isolating the output of the recursive filters from noise in the pixel values. Alternatively, the filtering steps 902 and 903 may be performed using the prefiltered pixel values. The pixel filtering at steps 902 and 903 may be recursive filtering as described above.

The filters of FIGS. 4*a* and 4*b*, the graphics system of FIG. 5, and the structure of FIG. 8 are shown as comprising a number of functional blocks. This is schematic only and is not intended to define a strict division between different logic elements of such entities. Each functional block can be provided in any suitable manner. It is to be understood that intermediate values described herein as being formed by the filter need not be physically generated by the filter at any point and may merely represent logical values which conveniently describe the processing performed by the filter between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

Code defining an integrated circuit may define an integrated circuit in any manner, including as a netlist, code for configuring a programmable chip, and as a hardware description language defining an integrated circuit at any level, including as register transfer level (RTL) code, as high-level circuit representations such as Verilog or VHDL, and as low-level circuit representations such as OASIS and GDSII. When processed at a suitably equipped computer system configured for generating a manifestation of an integrated circuit, code defining an integrated circuit may cause the computer system to generate a manifestation of the integrated circuit expressed by the code. Such computer systems may cause a manifestation of an integrated circuit to be generated by, for example, providing an output for controlling a machine configured to fabricate an integrated circuit or to fabricate an intermediate expression of the integrated circuit, such as a lithographic mask.

Higher level representations which logically define an integrated circuit (such as RTL) may be processed at a computer system configured for generating a manifestation of an integrated circuit in the context of a software environment comprising definitions of circuit elements and rules for combining those elements in order to generate the manifestation of an integrated circuit so defined by the representation.

As is typically the case with software executing at a computer system so as to define a machine, one or more intermediate user steps (e.g. providing commands, variables etc.) may be required in order for a computer system configured for generating a manifestation of an integrated circuit to execute code defining an integrated circuit so as to generate a manifestation of that integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A pixel filter, comprising:
an input arranged to receive a sequence of pixels, each pixel having an associated pixel value;
a filter module arranged to perform a first recursive filter operation in a first direction through the sequence of pixels so as to form a first filtered pixel value for each pixel, and perform a second recursive filter operation in a second direction through the sequence of pixels so as to form a second filtered pixel value for each pixel, wherein the first and second recursive filter operations form a respective filtered pixel value for a given pixel in dependence on the pixel value at that pixel and the filtered pixel value preceding that pixel in their respective direction of operation, the filtered pixel value of the preceding pixel being scaled by a measure of similarity between data associated with that pixel and its preceding pixel; and
filter logic configured to, for each pixel of the sequence, combine the first and second filtered pixel values formed in respect of the pixel by the first and second recursive filter operations so as to generate a filter output for the pixel.

2. A pixel filter as claimed in claim 1, the second direction being opposite to the first direction.

3. A pixel filter as claimed in claim 1, the first and second recursive filter operations being configured to scale the filtered pixel value of the preceding pixel such that its contribution to the filtered pixel value is greater when the measure of similarity is indicative of high similarity than when the measure of similarity is indicative of low similarity.

4. A pixel filter as claimed in claim 1, wherein the input is further arranged to receive a further sequence of pixels, the further sequence of pixels comprising at least one pixel value from the filter output, and the filter module is further arranged to perform the first and second recursive filter operations on the further sequence of pixels.

5. A pixel filter as claimed in claim 4, wherein the sequence of pixels represents one of:

a row of pixels selected from a rectangular array of pixels, and the further sequence of pixels represents a column of pixels selected from a rectangular array of pixels; and a column of pixels selected from a rectangular array of pixels, and the further sequence of pixels represents a row of pixels selected from a rectangular array of pixels.

6. A pixel filter as claimed in claim 1, the filter module being configured to, in forming a filtered pixel value for each pixel of the sequence, weight each pixel value by a measure of confidence in that pixel value.

7. A pixel filter as claimed in claim 6, wherein each pixel value and the measure of confidence in that pixel value represent a coordinate set, and the filter module is configured to concurrently operate on the components of each coordinate set so as to generate a filtered pixel value and filtered measure of confidence.

8. A pixel filter as claimed in claim 6, the pixel values being generated by path or ray tracing and the measure of confidence of each pixel value prior to filtering being indicative of the number of light rays which contributed to that pixel value.

9. A pixel filter as claimed in claim 1, the filter logic being configured to combine the first and second filtered pixel values for each pixel by calculating a weighted average of the first and second filtered pixel values, the weight of each filtered pixel value being formed in dependence on a measure of confidence in the pixel values which contributed to that filtered pixel value.

10. A pixel filter as claimed in claim 1, wherein the filter module comprises one of:

a recursive filter block configured to perform both the first and second recursive filter operations, such that the first recursive filter operation is performed in a first pass through the recursive filter block and the second recursive filter operation is performed in a second pass through the recursive filter block; and a first recursive filter block and a second recursive filter block arranged to operate concurrently, and wherein the first recursive filter block is configured to perform the first recursive filter operation and the second recursive filter block is configured to perform the second recursive filter operation.

11. A pixel filter as claimed in claim 1, further comprising a preliminary filter adapted to filter the pixel values so as to form a prefiltered pixel value for each pixel, and wherein the data associated with that pixel and its preceding pixel comprises, respectively, the prefiltered pixel value at that pixel and the prefiltered pixel value at the preceding pixel with respect to the direction of operation of the respective recursive filter operation.

12. A pixel filter as claimed in claim 11, wherein the preliminary filter has a filter radius at least an order of magnitude smaller than the first and second recursive filter operations.

13. A pixel filter as claimed in claim 11, wherein the preliminary filter is adapted to form a prefiltered pixel value at a pixel by forming a weighted mean of the pixel value and a predetermined set of pixel values adjacent to that pixel, the pixel value having a higher weight than the set of adjacent pixel values.

14. A pixel filter as claimed in claim 1, wherein each recursive filter comprises at least one of:

a recursive filter having an infinite filter radius;

an exponential filter; and a recursive filter including a preliminary filter arranged to form prefiltered pixel values for use at that recursive filter.

15. A pixel filter as claimed in claim 1, the pixels representing a raster image rendered so as to represent a three-dimensional scene and wherein the data associated with that pixel and its preceding pixel comprises one or more of: a pixel characteristic; and a scene characteristic of the three-dimensional scene at the points represented in the image by the pixel and preceding pixel.

16. A pixel filter as claimed in claim 15, wherein the scene characteristic comprises one or more of: a vector describing scene geometry, a normal vector describing the orientation of a surface in the scene, and a scene depth representing a measure of distance of a surface in the scene from a defined reference point, line or plane.

17. A pixel filter as claimed in claim 16, wherein the measure of similarity comprises at least one of: a measure of the angle between normal vectors of surfaces in the scene represented by the pixel and preceding pixel; and a measure of the difference in scene depth between the surfaces in the scene represented by the pixel and preceding pixel.

18. A non-transitory computer readable storage medium having stored thereon computer readable instructions that, when executed at a computer system for generating a manifestation of an integrated circuit, cause the computer system to generate a manifestation of a filter as claimed in claim 1.

19. A method for filtering a sequence of pixels, each pixel having an associated pixel value, the method comprising:

recursively filtering the sequence of pixels in first and second directions so as to form first and second filtered pixel values for each pixel by, for each pixel:

reading a filtered pixel value for the preceding pixel of the sequence with respect to the direction of operation of the recursive filter;

scaling the filtered pixel value of the preceding pixel of the sequence by a measure of similarity between data associated with the pixel and the preceding pixel; and forming a filtered pixel value for the pixel in dependence on the pixel value of the pixel and on the scaled filtered pixel value for the preceding pixel; and combining the first and second filtered pixel values formed in respect of each pixel of each sequence so as to generate a filter output for the pixel.

20. A non-transitory computer readable storage medium having stored thereon computer readable instructions that, when executed at a processor, cause the processor to perform a method as claimed in claim 19.

* * * * *